US00RE39583E

(19) United States
(12) Reissued Patent
Upchurch

(10) Patent Number: US RE39,583 E
(45) Date of Reissued Patent: Apr. 24, 2007

(54) MULTIPLE WELL TOOL CONTROL SYSTEMS IN A MULTI-VALVE WELL TESTING SYSTEM HAVING AUTOMATIC CONTROL MODES

(75) Inventor: James M. Upchurch, Sugarland, TX (US)

(73) Assignee: Schlumberger Technology Corporation, Sugar Land, TX (US)

(21) Appl. No.: 08/944,474

(22) Filed: Oct. 6, 1997

Related U.S. Patent Documents

Reissue of:
(64) Patent No.: 4,896,722
Issued: Jan. 30, 1990
Appl. No.: 07/295,874
Filed: Jan. 11, 1989

U.S. Applications:

(60) Continuation-in-part of application No. 07/295,614, filed on Jan. 10, 1989, now Pat. No. 4,915,168, which is a continuation-in-part of application No. 07/243,565, filed on Sep. 12, 1988, now Pat. No. 4,856,595, which is a division of application No. 07/198,968, filed on May 26, 1988, now Pat. No. 4,796,699.

(51) Int. Cl.
*E21B 34/08* (2006.01)
*E21B 49/04* (2006.01)
*E21B 47/06* (2006.01)

(52) U.S. Cl. ..... 166/250.15; 166/264; 166/374; 166/53; 166/64; 166/66.6; 166/66.7

(58) Field of Classification Search ..... 166/250.15, 166/53, 65.1, 66.4, 264, 374, 66.6, 66.7, 166/319, 332, 250.01
See application file for complete search history.

(56) References Cited

U.S. PATENT DOCUMENTS 3,254,531 A * 6/1966 Briggs, Jr. ..... 73/152.24
3,665,955 A * 5/1972 Conner, Sr. ..... 137/495
3,964,556 A 6/1976 Gearhart et al.
4,078,620 A 3/1978 Westlake et al.
4,292,842 A 10/1981 Hallmark
4,489,786 A * 12/1984 Beck ..... 166/374
4,553,589 A * 11/1985 Jennings et al. ..... 166/53
4,635,717 A * 1/1987 Jageler ..... 166/250.01
4,712,613 A * 12/1987 Nieuwstad ..... 166/53
5,113,379 A 5/1992 Scherbatskoy

FOREIGN PATENT DOCUMENTS

ZA 780466 1/1978

OTHER PUBLICATIONS

"Electronics and Computers", F.G. Rayer, Assoc. I.E.R.E. 1968, pp. 35–39, and 61.
"Analog Devices—Balanced Modulator/Demodulator" AD630 (Date unknown).

* cited by examiner

*Primary Examiner*—William Neuder
(74) *Attorney, Agent, or Firm*—Osha Liang LLP; Bryan P. Galloway; Jaime A. Castano

(57) ABSTRACT

A multi-valve well testing system adapted to be disposed downhole in a borehole, includes a plurality of valves and a plurality of well tool control systems connected, respectively, to the plurality of valves and further includes an automatic control mode feature. The well testing system includes a controller board which comprises a microprocessor and a read only memory (ROM). The ROM has encoded therein a set of microcode which, when executed by the microprocessor, causes the various plurality of valves in the well testing system to be opened and closed automatically, without intervention from the operator at the well surface. A kickoff stimulus is required in order to begin execution of the microcode by the microprocessor. This kickoff stimulus could include a sensing, by a pressure transducer, of a predetermined bottom hole pressure, or a sensing, by a strain gauge, of a predetermined set down weight of the well testing system. As a result, in response to a predetermined kickoff stimulus, the well testing system automatically begins a test which includes the automatic opening and closing of a plurality of valves a predetermined number of times, and in a predetermined sequence.

42 Claims, 14 Drawing Sheets

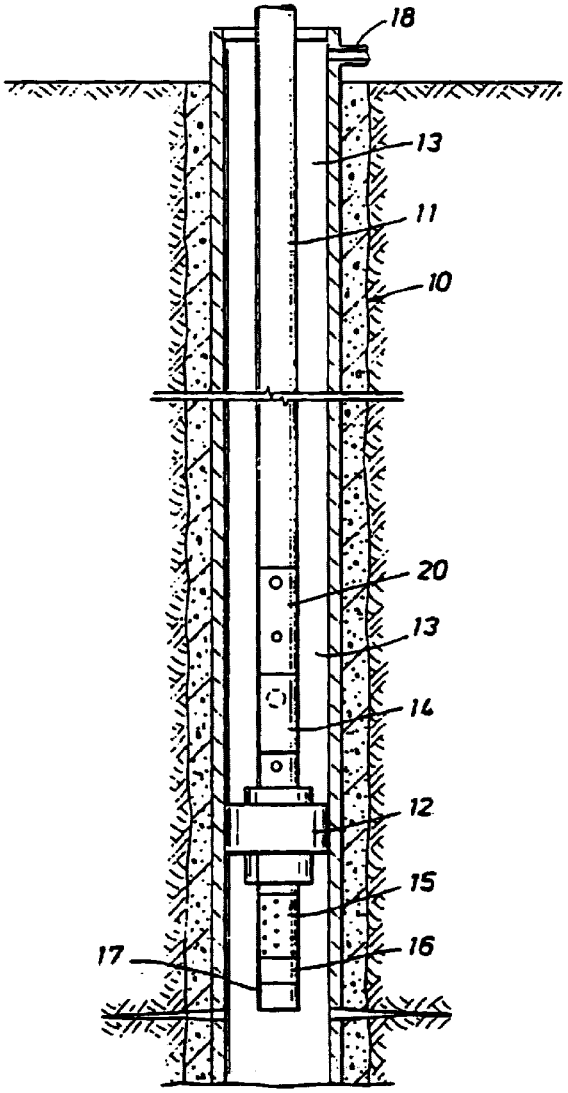
FIG. 1
FIG. 4
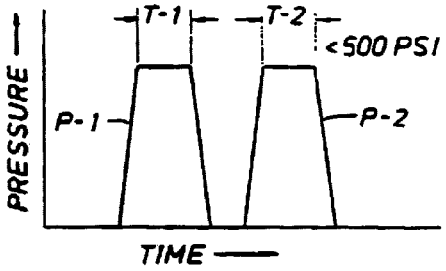
FIG. 3
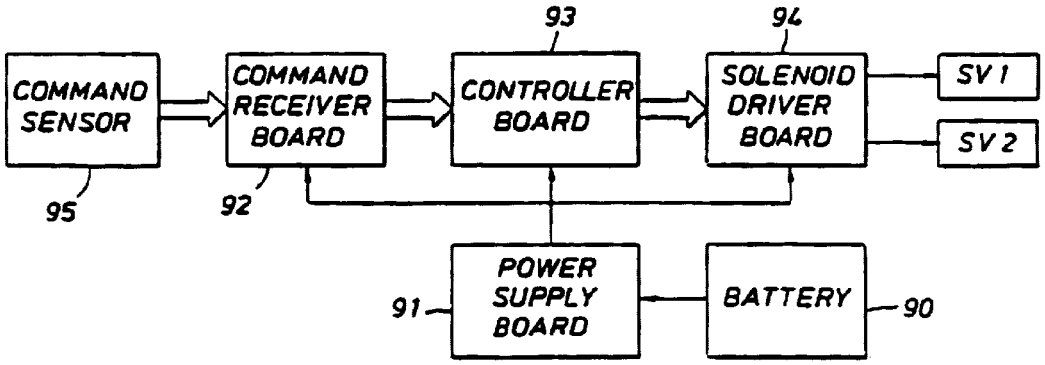

FIG. 9
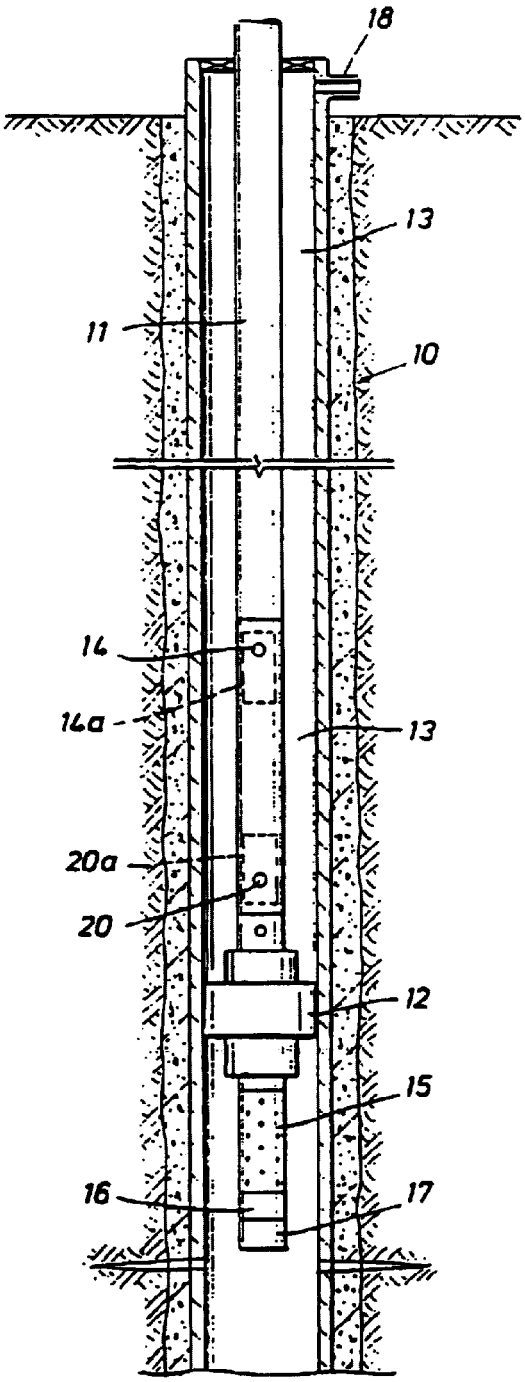
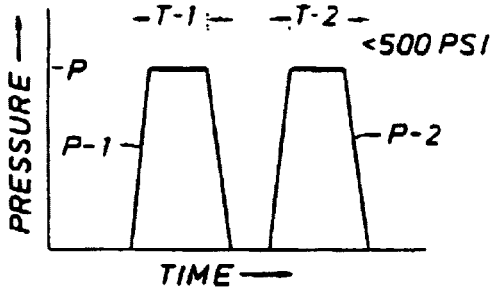
FIG. 13A
FIG. 14A
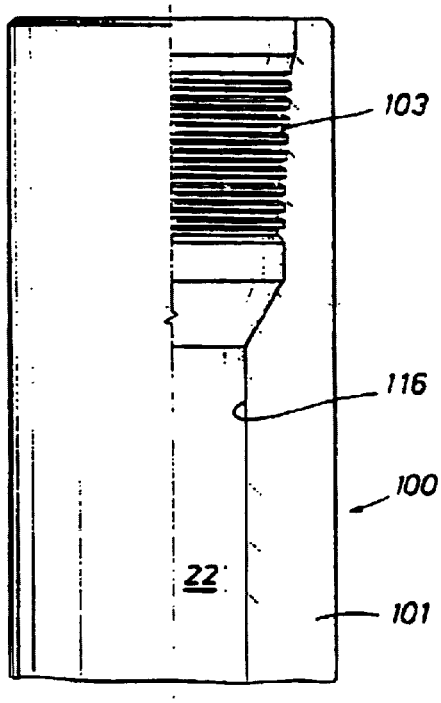

FIG. 12
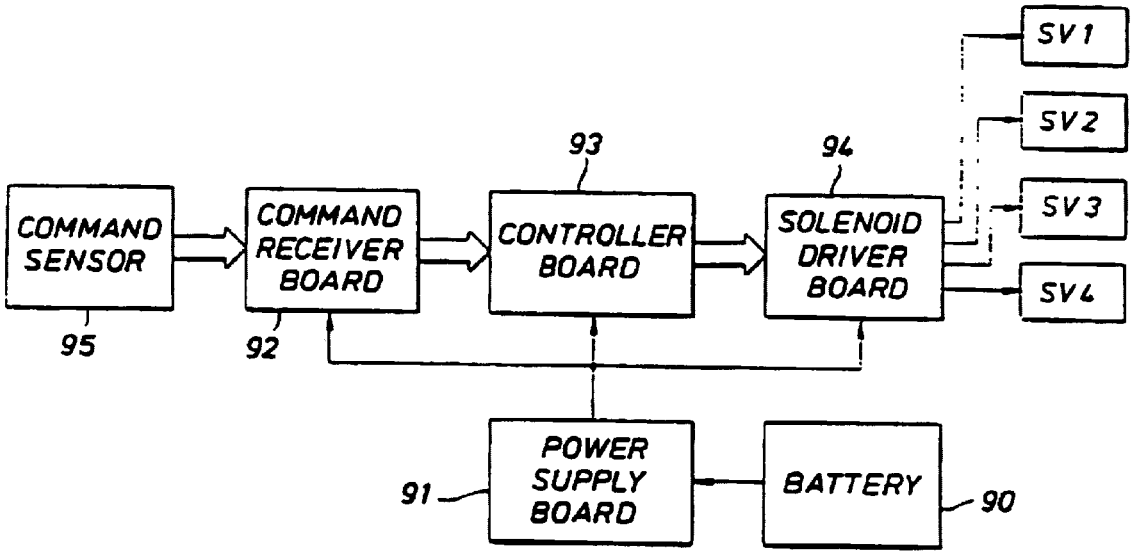
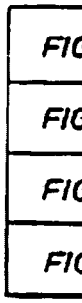
FIG. 14
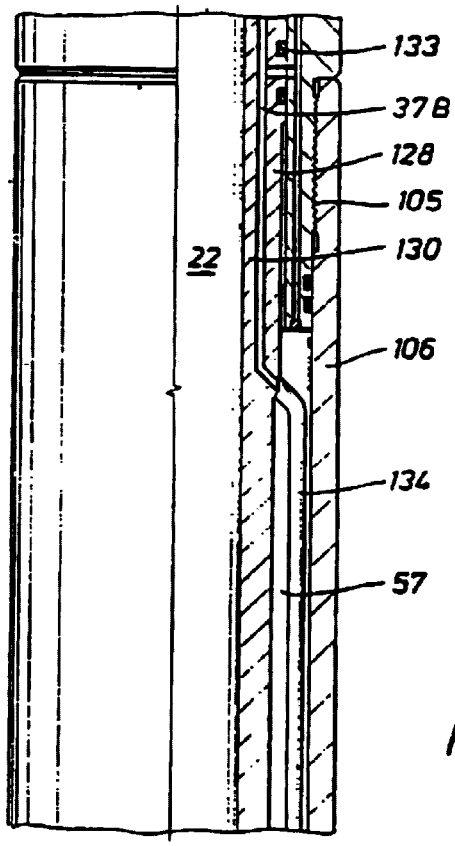
FIG. 14D

TYPICAL BOTTOM HOLE PRESSURE vs. TIME PLOT

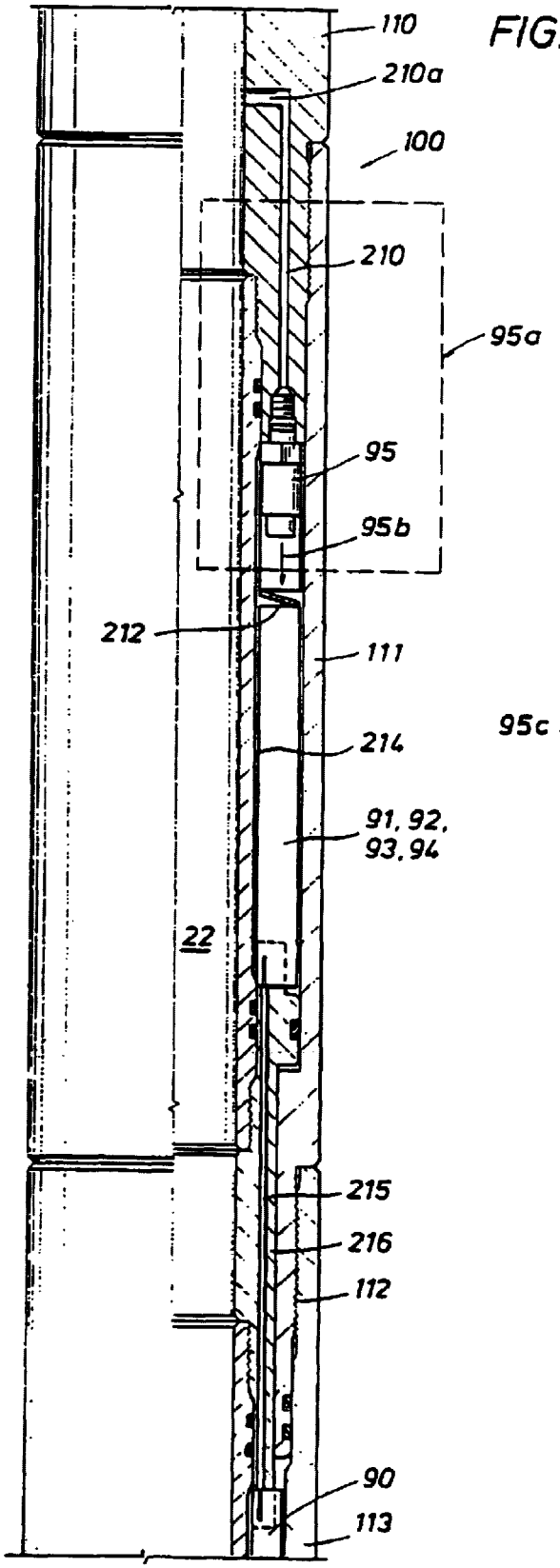
FIG. 17
FIG. 18
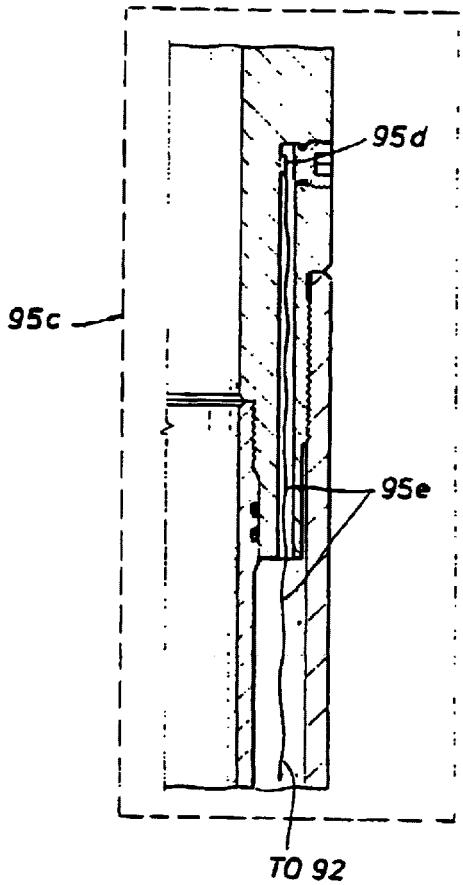

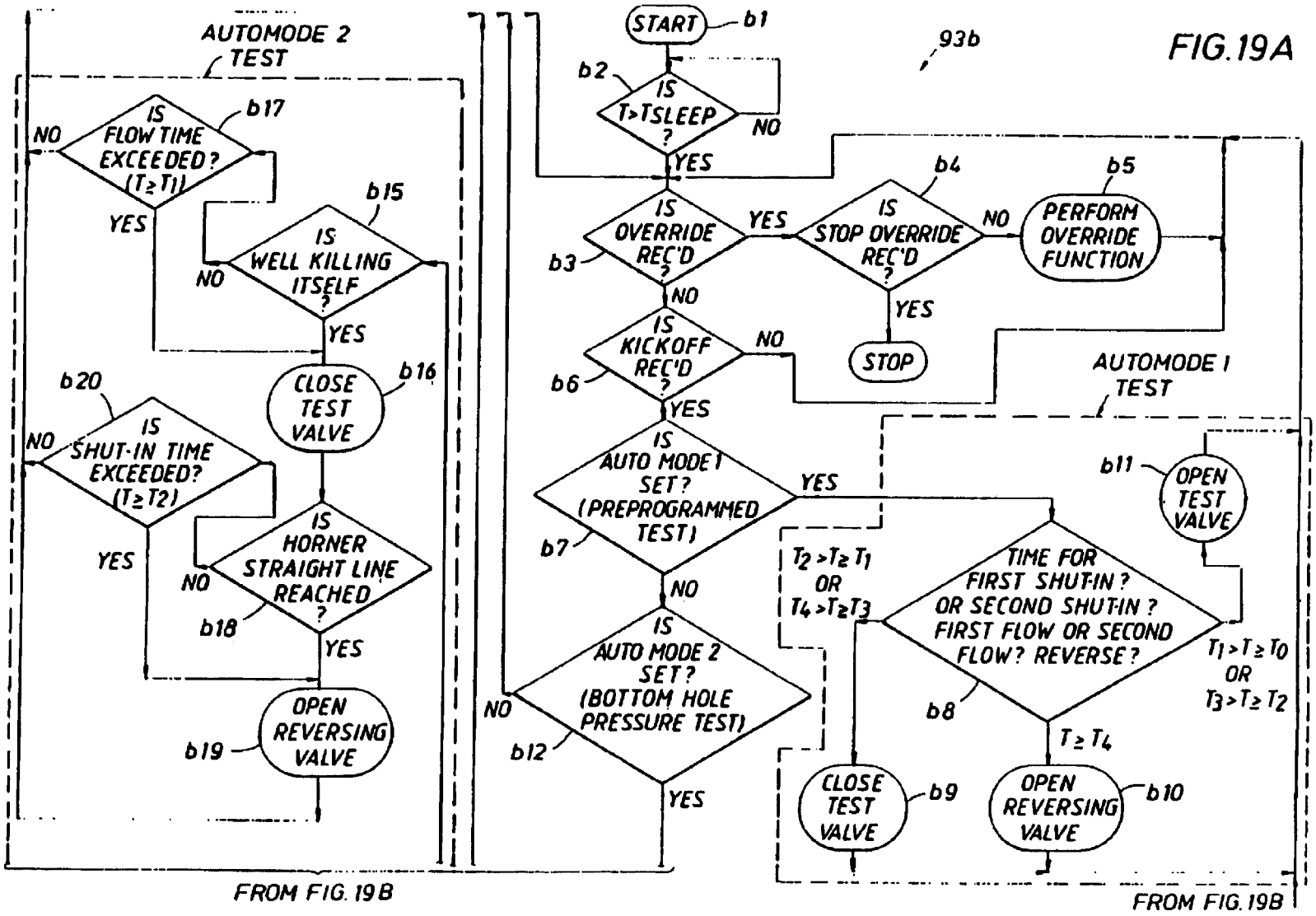
FIG. 19A
93b
START
b1
IS T>TSLEEP ?
b2
YES
NO
IS OVERRIDE REC'D ?
b3
YES
NO
IS STOP OVERRIDE REC'D ?
b4
YES
NO
STOP
PERFORM OVERRIDE FUNCTION
b5
IS KICKOFF REC'D ?
b6
YES
NO
IS AUTO MODE 1 SET? (PREPROGRAMMED TEST)
b7
YES
NO
IS AUTO MODE 2 SET? (BOTTOM HOLE PRESSURE TEST)
b12
YES
NO
AUTOMODE 1 TEST
OPEN TEST VALVE
b11
TIME FOR FIRST SHUT-IN ? OR SECOND SHUT-IN ? FIRST FLOW OR SECOND FLOW? REVERSE ?
b8
T1>T≥T0 OR T3>T≥T2
T≥T4
T2>T≥T1 OR T4>T≥T3
OPEN REVERSING VALVE
b10
CLOSE TEST VALVE
b9
FROM FIG. 19B
AUTOMODE 2 TEST
IS FLOW TIME EXCEEDED? (T≥T1)
b17
YES
NO
IS WELL KILLING ITSELF ?
b15
YES
NO
CLOSE TEST VALVE
b16
IS HORNER STRAIGHT LINE REACHED ?
b18
YES
NO
IS SHUT-IN TIME EXCEEDED? (T≥T2)
b20
YES
NO
OPEN REVERSING VALVE
b19
FROM FIG. 19B

MULTIPLE WELL TOOL CONTROL SYSTEMS IN A MULTI-VALVE WELL TESTING SYSTEM HAVING AUTOMATIC CONTROL MODES

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 295,614 entitled "Multiple Well Tool Control Systems in a Multi-valve Well Testing System", filed 1/10/89, which application is a continuation in part of application Ser. No. 243,565 filed Sept. 12, 1988, now U.S. Pat. No. 4,856,595, which is a divisional application of application Ser. No. 198,968 filed May 26, 1988, U.S. Pat. No. 4,796,699.

BACKGROUND OF THE INVENTION

The subject matter of the present invention pertains to an automatic well tool control system, and, more particularly, to multiple well tool control systems in a multi-valve well testing system including a means for automatically controlling the well tool control systems in response to kickoff stimulus which may include a sensing of bottom hole pressure or a sensing of the output of a strain gauge responsive to a set down weight of the well tool apparatus.

Multi-valve well testing tools of the prior art such as the well testing tools disclosed in U.S. Pat. No. 4,553,589 entitled "Full Bore Sampler Valve Apparatus", and in U.S. Pat. No. 4,576,234 entitled "Full Bore Sampler Valve", are typically mechanical in nature in that one valve disposed in the tool is mechanically linked to another valve disposed in the tool. If it is desired to open the one valve, an operator at the well surface, upon opening the one valve, must expect the other valve to be opened or closed as well since the two valves are mechanically linked together. Therefore, the operation of one valve is not independent of the operation of the other valve, and when one valve in the tool is opened, other valves disposed in the tool must be opened or closed in a specific predetermined sequence. A more recent and innovative apparatus for performing such well service operations, embodying pressure controlled valve devices, is shown in application Ser. No. 198,968, filed May 26, 1988, now U.S. Pat. No. 4,796,699, entitled "Well Tool Control System", assigned to the assignee of this invention, the disclosure of which is incorporated by reference into the specification of this application. In application Ser. No. 198,968 referenced hereinabove, a well testing tool is disclosed which is not totally mechanical in nature, rather, it embodies a microelectronics package and a set of solenoids responsive to the microelectronics package for opening or closing valve disposed in the tool. A set of solenoids embodied in the well tool of application Ser. No. 198,968 are energized by a microcontroller also embodied in the well tool, which microcontroller is responsive to an output signal from any type of sensor, such as a pressure transducer embodied in the tool that further responds to changes in downhole pressure created and initiated by an operator at the well surface. It is understood that the sensor may be responsive to other stimuli than downhole pressure. The solenoids, when energized in a first predetermined manner, open and close a set of pilot valves that permit a hydraulic fluid under pressure, stored in a high pressure chamber, to flow to another section of the tool housing where an axially movable mandrel is positioned. The fluid moves the mandrel from a first position to a second position thereby opening another valve in the tool (for example, a test valve or a reversing valve). When the set of solenoids are energized in a second predetermined manner, the hydraulic fluid, stored in the other section of the tool housing, where the movable mandrel is positioned, is allowed to drain from the housing to a separate dump chamber; as a result, the mandrel moves from the second position to the first position, thereby closing the other valve. In each case, the solenoids are responsive to an output signal from the microcontroller, which is, in turn, responsive to an output signal from the sensor, which is, in turn, responsive to changes in other input stimuli, such as changes in pressure in the well annulus. The change in input stimuli is created and initiated, each time, by the operator at the well surface. Therefore, an opening or closing of the other valve in the tool is responsive, each time, to a stimulus change signal (such as changes in downhole pressure) transmitted into the borehole by the operator at the well surface. However, application Ser. No. 198,968 discloses a well testing tool which includes one well tool control system for controlling the closure state of one valve. The above referenced well testing tool could also contain a plurality of well tool control systems for opening and closing a plurality of valves. In this case, two or more of the above well tool control systems and two or more corresponding valves would be embodied in a well testing tool. The two or more of such well tool control systems would open and close the two or more valves in response to predetermined input signals. An operator need only transmit into a borehole the two or more unique input signals corresponding to the two or more separate valves. As a result, the operation of one valve disposed in the tool would be performed totally independently of the operation of any other valve disposed in the tool. In the application Ser. No. 295,614, referenced above, a well testing system is disclosed including two or more well tool control systems interconnected respectively between two or more valves and a microcontroller. Whenever a valve must be opened or closed, the operator must transmit an input stimulus into the borehole, such as a pressure signal; the microcontroller generates its output signal in response to the input stimulus for energizing one of the control systems which then operates a particular valve. However, when it is desired to operate two or more valves in sequence, a separate input stimulus must be generated in the well testing system for each of the two or more valves. If suitable microcode were provided in the microcontroller, a plurality of openings and closings of the two or more valves in the tool could be accomplished automatically by the microcontroller upon execution of its own microcode in response to an initial kickoff stimulus generated in the well testing system, such as a sensing of a bottom hole pressure or a sensing of a strain gauge output sensitive to a set down weight of the well testing tool in the borehole.

SUMMARY OF THE INVENTION

Accordingly, it is a primary object of the present invention to automatically control the operation of multiple well tool control systems disposed in a well testing system by providing such control systems with a microcontroller including a processor and a memory, the memory storing a set of microcode which, when executed by the processor, automatically opens and closes a set of valves in the tool a predetermined number of times, in a predetermined sequence, in response to a predetermined initial kickoff stimulus.

It is a further object of the present invention to initiate execution of the microcontroller microcode in response to an output signal from a pressure transducer, which transducer senses a bottom hole pressure of the well fluids present in the well annulus below a packer.

It is a further object of the present invention to initiate execution of the microcontroller microcode in response to an output signal from a strain gauge, which strain gauge senses, for example, the set down weight of the well testing tool when situated in the borehole of an oil well.

It is a further object of the present invention to initiate execution of the microcontroller microcode in response to an output signal from a pressure transducer which senses annulus pressure above the packer, or in response to an output signal from a timer which counts down a predetermined time delay.

These and other objects of the present invention are accomplished be designing a set of microcode for incorporation in a memory chip resident on a microcontroller chip of multiple well tool control systems disposed in a well testing system. The microcontroller chip includes a processor portion and a memory chip, the novel microcode of the present invention being stored in the memory chip, such as a Read Only Memory (ROM). When an initial kickoff stimulus is received by the microcontroller chip, the processor portion of the chip executes the microcode stored in the memory chip. During execution of the microcode, the processor portion of the chip generates certain output signals which cause other valves in the well testing tool to open or close. The kickoff stimulus may be either an output signal from a pressure transducer indicative of a bottom hole pressure, in the well annulus below the packer in the borehole, or indicative of annulus pressure above a packer, or an output signal from a strain gauge indicative of a set down weight or a torque of the tool when the tool is disposed in a particular position in the borehole. When the processor portion generates the output signals in response to execution of its resident microcode of the present invention, a typical flow/shut-in test may be performed, or a test valve and reversing valve may be opened and closed in an exact preprogrammed sequence. As a result, the results of a test may be based on direct measurements of existing downhole conditions, the measurements being made directly due to the automatic execution of a set of microcode resident in the memory chip of a downhole microcontroller. Using this approach, there is no need to transmit signals from the surface, through the manipulation of pipe or annulus pressure to control the downhole tool, each time an operation is performed downhole. The changes for misrun caused by manipulation of the pipe or annulus pressure to control the test valve is greatly reduced. Furthermore, an exact preset test sequence may be completed and the chances for the commission of human error are greatly reduced (a distinct advantage in open-hole situations where approximately 80% of the test sequences are preset and inflexibly carried out).

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 1 is a schematic view of a string of drill stem testing tools positioned in a well being tested;

FIG. 3 is a block diagram of the control components used to operate the hydraulic system of FIG. 2;

FIG. 4 is a pressure time diagram to illustrate a command signal comprising a sequence of low level pressure pulses;

FIG. 9 illustrates the schematic view of a string of drill stem testing tools, of FIG. 1, modified to include a test valve and a reversing valve;

FIG. 12 illustrates the block diagram of the control components of FIG. 3, modified to energize the solenoids associated with one set of valves as well as the solenoids associated with another set of valves of the well testing tool;

FIG. 13a illustrates a typical pressure time diagram associated with one of the well tool control systems disposed in the well testing tool of FIGS. 9–14; and FIG. 14 including FIGS. 14a through 14d illustrates a well testing tool which embodies two valves that are connected to two corresponding well tool control systems.

FIG. 17 illustrates a view of a pressure transducer which senses an input stimulus comprising bottom hole pressure below a packer;

FIG. 18 illustrates a view of a strain gauge which senses an input stimulus comprising a set down weight or torque of the tool when disposed in a particular position in a borehole.

DETAILED DESCRIPTION OF THE PREFERRED EMBODIMENT

Figure 2:
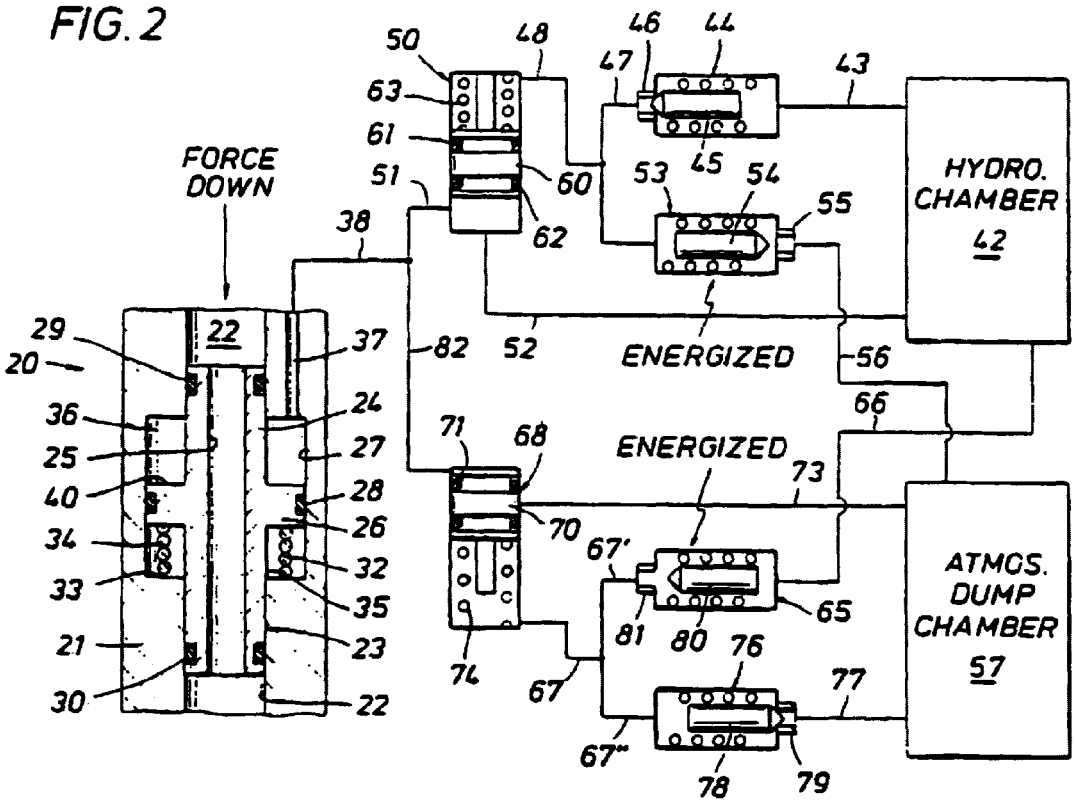
FIG. 2 is a schematic drawing of the hydraulic components of the present invention.

The following detailed description is divided into three parts: (1) part A entitled "Well Tool Control System" which describes the well tool control system as set forth in prior pending application Ser. No. 243,565, filed Sept. 12, 1988, now U.S. Pat. No. 4,856,595; assigned to the same assignee as that of the present invention, which application Ser. No. 243,565 is incorporated herein by reference, application Ser. No. 243,565 being a divisional application of application Ser. No. 198,968, filed May 26, 1988, now U.S. Pat. No. 4,796,699, assigned to the same assignee as that of the present invention, which application Ser. No. 198,968 is also incorporated herein by reference; (2) part B which represents a continuation-in-part of prior pending application Ser. No. 243,565 referenced hereinabove in part A, and describes "multiple well tool control systems in a multi-valve well testing system" as set forth in prior pending application Ser. No. 295,614 filed 1/10/89, assigned to the same assignee as that of the present invention, which application is incorporated herein by reference; and (3) part C which represents a continuation-in-part of prior pending application Ser. No. 295,614 referenced hereinabove in part B, and describes "multiple well tool control systems in a multi-valve well testing system having automatic control modes", in accordance with the present invention.

A. Well Tool Control System

Referring initially to FIG. 1, a string of drill stem testing tools is shown suspended in well bore 10 on drill pipe or tubing 11. The testing tools comprise a typical packer 12 that acts to isolate the well interval being tested from the hydrostatic head of fluids standing in the annulus space 13 thereabove, and a main test valve assembly 14 that serves to permit or to prevent the flow of formation fluids from the isolated interval into the pipe string 11. The main valve 14 is closed while the tools are being lowered, so that the interior of the tubing provides a low pressure region into which formation fluids can flow. After the packer 12 is set, the valve 14 is opened for a relatively short flow period of time during which pressures in the well bore are reduced. Then the valve 14 is closed for a longer flow period of time during which pressure build-up in the shut-in well bore is recorded. Other equipment components such as a jar and a safety joint can be coupled between the test valve 14 and the packer 12, but are not illustrated in the drawing because they are notoriously well known. A perforated tail pipe 15 is connected to the lower end of the mandrel of the packer 12 to enable fluids in the well bore to enter the tool string, and typical inside and outside pressure recorders 16, 17 are provided for the acquisition of pressure data as the test proceeds.

A circulating valve 20 that has been chosen to illustrate the principles of the present invention is connected in the tool string above the main test valve assembly 14. As shown schematically in FIG. 2, the valve assembly 20 includes an elongated tubular housing 21 having a central flow passage 22. A valve actuator 23 is slidably mounted in the housing 21, and includes a mandrel 24 having a central passage 25 and an outwardly directed annular piston 26 that is sealed by a seal ring 28 with respect to a cylinder 27 in the housing 21. Additional seal rings 29, 30 are used to prevent leakage between the cylinder 27 and the passage 22. The seal rings 29, 30 preferably engage on the same diameter so that the mandrel 24 is balanced with respect to fluid pressures within the passageway 22. A coil spring 32 located in the housing below the piston 26 reacts between an upwardly facing surface 33 at the lower end of the cylinder 27 and a downwardly facing surface 34 of the piston 26. The spring 32 provides upward force tending to shift the mandrel 24 upwardly relative to the housing 21. The annular area 35 in which the spring 32 is positioned contains air at atmospheric or other low pressure The cylinder area 36 above the piston 26 is communicated by a port 37 to a hydraulic line 38 through which oil or other hydraulic fluid is supplied under pressure. A sufficient pressure acting on the upper face 40 of the piston 26 will cause the mandrel 24 to shift downward against the resistance afforded by the coil spring 32, and a release of such pressure will enable the spring to shift the mandrel upward to its initial position. The reciprocating movement of the mandrel 24 is employed, as will be described subsequently, to actuate any one of a number of different types of valve elements which control the flow of fluids either through the central passage 22 of the housing 21, or through one or more side ports through the walls of the housing 21.

The source of hydraulic fluid under pressure is a chamber 42 that is filled with hydraulic oil. As will be explained below, the chamber 42 is pressurized by the hydrostatic pressure of well fluids in the well annulus 13 acting on a floating piston which transmits such pressure to the oil. A line 43 from the chamber 42 leads to a first solenoid valve 44 which has a spring loaded, normally closed valve element 45 that engages a seat 46. Another line 47 leads from the seat 46 to a line 48 which communicates with a first pilot valve 50 that functions to control communication between a hydraulic line 51 that connects with the actuator line 38 and a line 52 that also leads from the high pressure chamber 42. A second solenoid valve 53 which also includes a spring loaded, normally closed valve element 54 engageable with a seat 55 is located in a line 56 that communicates between the lines 47, 48 and a dump chamber 57 that initially is empty of liquids, and thus contains air at atmosphere [on] *or* other low pressure.

The pilot valve 50 includes a shuttle element 60 that carried seal rings 61, 62, and which is urged toward a position closing off the cylinder line 51 by a coil spring 63. However when the second solenoid valve 53 is energized open by an electric current, the shuttle 60 will shift to its open position as shown, hydraulic fluid behind the shuttle 60 being allowed to exhaust via the lines 48 and 56 to the low pressure dump chamber 57. With the pilot valve 50 open, pressurized oil from the chamber 42 passes through the lines 52, 51 and 38 and into the cylinder region 36 above the actuator piston 26. The pressure of the oil, which is approximately equal to hydrostatic pressure, forces the actuator mandrel 24 downward against the bias of the coil spring 32.

The hydraulic system as shown in FIG. 2 also includes a third, normally closed solenoid valve 65 located in a line 66 that extends from the chamber 42 to a line 67 which communicates with the pressure side of a second pilot valve 68. The pilot valve 68 also includes a shuttle 70 that carries seal rings 71, 72 and which is urged toward its closed position by a coil spring 74, where the shuttle closes an exhaust line 73 that leads to the dump chamber 57. A fourth, normally closed solenoid valve 76 is located in a line 77 which communicates between the pressure line 67 of the pilot valve 68 and the dump chamber 57. The solenoid valve 76 includes a spring biased valve element 78 that coacts with a seat 79 to prevent flow toward the dump chamber 57 via the line 77 in the closed position. In like manner, the third solenoid valve 65 includes a spring-loaded, normally closed valve element 80 that coacts with a seat 81 to prevent flow of oil from the high pressure chamber 42 via the line 66 to the pilot input line 67 except when opened, as shown, by electric current supplied to its coil. When the solenoid valve 65 is open, oil under pressure supplied to the input side of the pilot valve 68 causes the shuttle 70 to close off the dump line 73. Although high pressure also may be present in the line 82 which communicates the outer end of the shuttle 70 with the lines 51 and 38, the pressures in lines 67 and 82 are equal, whereby the spring 74 maintains the shuttle closed across the line 73. Although functionally separate pilot valve has been show, it will be recognized that a single three-way pilot valve could be used.

In order to permit the power spring 32 to shift the actuator mandrel 24 upward from the position shown in FIG. 2, the first and fourth solenoid valves 44 and 76 are energized, and the second and third solenoid valves 53 and 65 simultaneously are de-energized. When this occurs, the solenoid valves 53 and 65 shift to their normally closed positions, and the valves 44 and 76 open. The opening of the valve element 45 permits pressures on opposite sides of the shuttle 60 to equalize, whereupon the shuttle 60 is shifted by its spring 63 to the position closing the cylinder line 51. The valve element 54 of the solenoid valve 53 closes against the seat 55 to prevent pressure in the chamber 42 from venting to the dump chamber 57 via the line 56. The closing of the valve element 80 and the opening of the valve element 78 communicates the pilot line 67 with the dump chamber 57 via line 77, so that high cylinder pressure in the lines 38 and 82 acts to force the shuttle 70 to shift against the bias of the spring 74 and to open up communication between the lines 82 and 73. Thus hydraulic fluid in the cylinder region 36 above the piston 26 is bled to the dump chamber 57 as the power spring 32 extends and forces the actuator mandrel [20] *24* upward to complete a cycle of downward and upward movement. The solenoid valves 44, 53, 65, and 76 can be selectively energized in pairs, as described above, to achieve additional cycles of actuator movement until all the hydraulic oil has been transferred from the chamber 42 to the dump chamber 57. Of course the actuator mandrel [20] *24* is maintained in either its upward or its downward position when all solenoid valves are de-energized.

As will be described below with reference to the various drawings which constitute FIG. 5, working medium under pressure can be supplied to the region 35 below the piston 26 to force upward movement of the actuator mandrel 24. In that event the spring 32 need not be used, and another set of pilot valves and solenoid valves as shown in FIG. 2 could be used.

A control system for selectively energizing the solenoid valves 43, 53, 65 and 76 is shown schematically in FIG. 3 by way of a functional block diagram. The various components illustrated in the block diagram are all mounted in the walls of the housing 21 of the circulating valve 20, as will be explained subsequently in connection with FIGS. 5A–5F. One or more batteries 90 feed a power supply board 91 which provides electrical power output to a command receiver board 92, a controller board 93 and a solenoid driver board 94. The command signal applied at the surface to the well annulus 13 is sensed by a transducer 95, which supplies an electrical signal representative thereof to the receiver board 92. The receiver board 92 functions to convert a low level electrical signal from the transducer 95 into an electrical signal of a certain format, which can be interrogated by the controller board 93 to determine whether or not at least one, and preferably two or more, electrical signals representing the command signature are present in the output of the sensor 95. If, and only if, such is the case, controller board 93 supplies an output signal which triggers operation of the driver board [99] *94* which enables the driver to supply electric current to selected pairs of the solenoid valves 43, 53, 65, and 76, the pairs being indicated schematically as SV-1 and SV-2 in the drawing.

FIG. 4 is a pressure-time diagram which illustrates one embodiment of command signal which will initiate valve operation. As shown, the signal is in the form of a series of low level pressure pulses P-1, P-2. The pressure pulses P-1 and P-2 are applied at the surface to the fluids standing in the well annulus 13 via the line 18 as shown in FIG. 1, with each pressure pulse being applied for a definite time period, and then released. Such time periods are illustrated as T-1 and T-2 in the drawing. These discrete pressure pulses are separated by short time intervals as indicated, however the lengths of such intervals are not significant in the embodiment shown. The levels of the applied pressure pulses are relatively low, and for example need not exceed 500 psi. The duration of the peak value T-1, T-2 of each pulse can be quite short, for example 30 seconds. However unless and until the receiver 92 is provided with an output signal from the transducer 95 that includes voltages that rise to a certain level and are maintained at that level for the prescribed time periods, the controller 93 does not provide outputs to the driver 94. In this way, spurious or random pressure increases or changes that might occur as the tools are lowered, and the like, are discriminated against, and do not trigger operation of the control system. A single pressure pulse P-1 could be used to trigger the controller 93, however a requirement of a series of at least two such pulses is preferred.

It will be recognized that a number of features of the present invention described thus far coact to limit power requirements to a minimum. For example, the solenoid valves are normally closed devices, with power being required only when they are energized and thus open. The controller board 93 does not provide an output unless its interrogation of the output of receiver 92 indicates that a command signal having a known signature has been sensed by the transducer 95. Then of course the driver 94 does not provide current output to a selected pair of the solenoid valves unless signalled to do so by the controller board 93. In all events, the only electrical power required is that necessary to power the circuit boards and to energize solenoid valves, because the forces which shift the actuator mandrel 24 are derived from either the difference in pressure between hydrostatic and dump chamber pressures, or the output of the spring 32. Thus the current drain on the batteries 90 is quite low, so that the system will remain operational for extremely long periods of downhole time The structural details of a circulating valve assembly 20 that is constructed in accordance with the invention are shown in detail in FIGS. 5A–5F. The circulating valve assembly 20 includes an elongated tubular housing, indicated generally at 100, comprising an upper sub 101 having one or more circulating ports 102 that extend through the wall thereof. Threads 103 at the upper end of the sub 101 are used to connect the housing 100 to the lower end of the tubing 11, or to another tool string component thereabove. The upper sub 101 is threaded at 99 (FIG. 5B) to the upper end of an adapter sleeve 104, which is, in turn, threaded at 105 to the upper end of a tubular dump chamber member 106. The member 106 is threadedly connected to a tubular oil chamber member 107 (FIG. 5C) by an adapter sleeve 108, and the lower end of the member 107 is threaded at 109 (FIG. 5D) to the upper end of a pilot and solenoid valve sub 110. The sub 110 is threaded to another tubular member 111 (FIG. 5E) which houses the pressure transducer 95, as well as all the various circuit boards discussed above in connection with FIG. 3. Finally the member 111 has its lower end threaded at 112 to the upper end of a battery carrier sub 113 which houses one or more batteries 90 in suitable recesses 114 in the walls thereof. The lower end of the battery sub 113 has pin threads 115 (FIG. 5F) by which the lower end of the housing 100 can be connected to, for example, the upper end of the main tester valve assembly 14.

Referring again to FIGS. 5A and 5B, the upper housing sub 101 is provided with stepped diameter internal surfaces that define a central passage 22, a seal bore 117, and a cylinder bore 118. An actuator mandrel 24 having an outwardly directed piston section 26 is slidably disposed within the sub 101, and carries seal rings 30, 28 and 29 which seal, respectively, against the seal bore 117, the cylinder wall 118 and a lower seal bore 120 that is formed in the upper end portion of the adaptor 104. The diameters of sealing engagement of the rings 30 and 29 preferably are identical, so that the mandrel 24 is balanced with respect to internal fluid pressures. An oil passage 37 leads via a port 122 to the cylinder region 36 above the piston 26, and is communicated by ports 123 to a continuing passage 37A that extends downward in the adapter sub 104. Seals 124 prevent leakage at the ports 123, as well as past the threads 99.

In the embodiment shown in FIG. 2, downward force on the mandrel 24 is developed by pressurized oil in the cylinder region 36, with upward force being applied by the spring 32 which is located in an atmospheric chamber 35. In the embodiment shown in FIGS. 5A–5F, upward force on the mandrel 24 also is developed by pressurized oil which is selectively applied to a cylinder region 126 below the piston 26. Of course both embodiments are within the scope of the present invention. Where pressurized oil is employed to develop force in each longitudinal direction, another oil passage 125 extends from the cylinder region 126 below the piston 26 downward in the adapter sub 104, as shown in solid and phantom lines on the left side of FIG. 5B. Although not explained in detail, the structure for extending the passage 125 downward in the housing 100 to the control valve sub is essentially identical to that which is described respecting the passage 37.

The oil passage 37A crosses over at ports 126 to another passage 37B which is formed in the upper section 128 of a transfer tube 130. The section 128 carries seal rings 131–133 to prevent fluid leakage, and the lower end of the passage 37B is connected to a length of small diameter patch tubing 134 which extends downward through an elongated annular cavity 57 formed between the outer wall of the transfer tube 130 and the inner wall of the chamber sub 106. The cavity 57 forms the low pressure dump chamber described above with reference to FIG. 2 and can have a relatively large volume, for example 150 cubic inches in the embodiment shown. The lower end of the patch tube 134 connects with a vertical passage 37C (FIG. 5C) in the lower section 136 of the transfer tube 130, which crosses out again at ports 139 which are suitably sealed as shown, to a passage 37D which extends downward in the adapter sub 108. Near the lower end of the sub 108, the passage crosses out again at ports 137 to an oil passage 37E which extends downwards in the wall of the oil chamber sub 107.

An elongated tube 140 is positioned concentrically within the sub 107 and arranged such that another elongated annular cavity 42 is formed between the outer wall surface of the tube and the inner wall surface of the sub. The cavity 42 forms the high pressure oil chamber shown schematically in FIG. [3] *2*, and also can have a volume in the neighborhood of 150 cubic inches. Outer seal rings 143–146 seal against the chamber sub 108 adjacent the ports 137, and inner seal rings 147 seal against the upper end section of the tube 140.

Figure 5A:
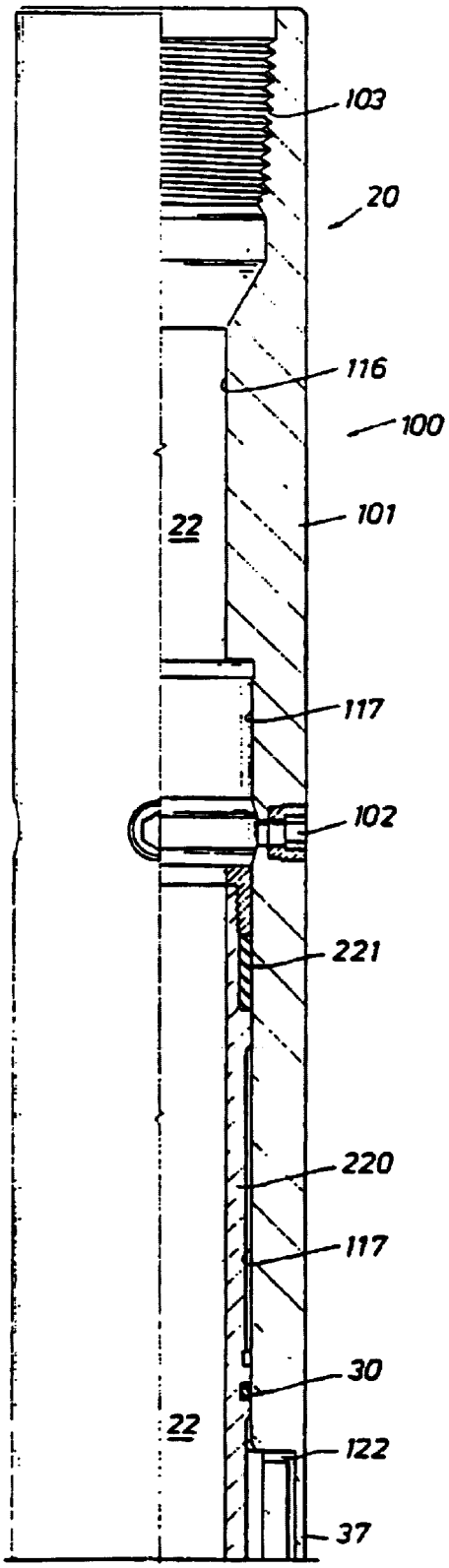
FIGS. 5A–5F are longitudinal sectional views, with some portions in side elevations, of a circulating valve component of a drill stem testing string (the upper portion of FIG. 5D being rotated with respect to the lower portion thereof to show pressure passages in section)
Figure 5B:
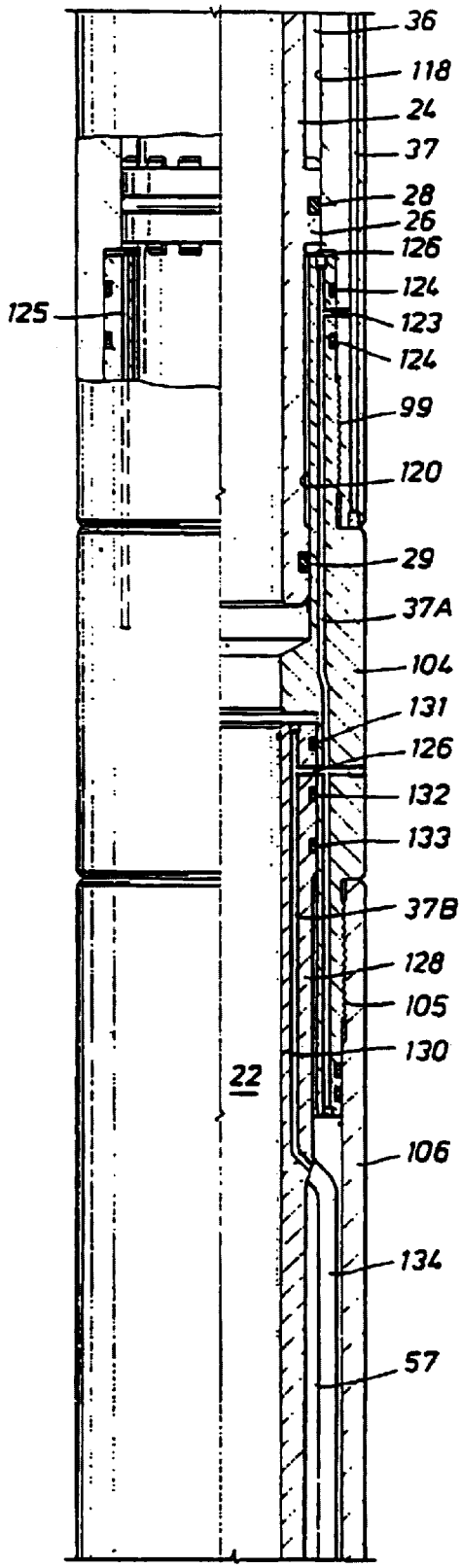

A hydrostatic pressure transfer piston 150 in the form of a ring member that carries inner and outer seals 156, 157 is slidably mounted within the annular chamber 42, and is located at the upper end thereof when the chamber is full of oil. The region 151 above the piston 150 is placed in communication with the well annulus outside the housing 100 by one or more radial ports 152. As shown in FIG. 5D, the lower end of the chamber 42 is defined by the upper face of the upper section 153 of a pilot and solenoid valve sub 110, and inner and outer seal rings 155, 154 prevent fluid leakage. The chamber 42 is filled at the surface with a suitable hydraulic oil, and as the tools are lowered into a fluid-filled well bore, the piston 150 transmits the hydrostatic pressure of well fluids to the oil in the chamber 42, whereby the oil always has a pressure substantially equal to such hydrostatic pressure. The dump chamber 57, on the other hand, initially contains air at atmospheric or other relatively low pressure. The difference in such pressures therefore is available to generate forces which cause the valve actuator mandrel 24 to be shifted vertically in either direction, as will be described in more detail below.

Figure 5C:
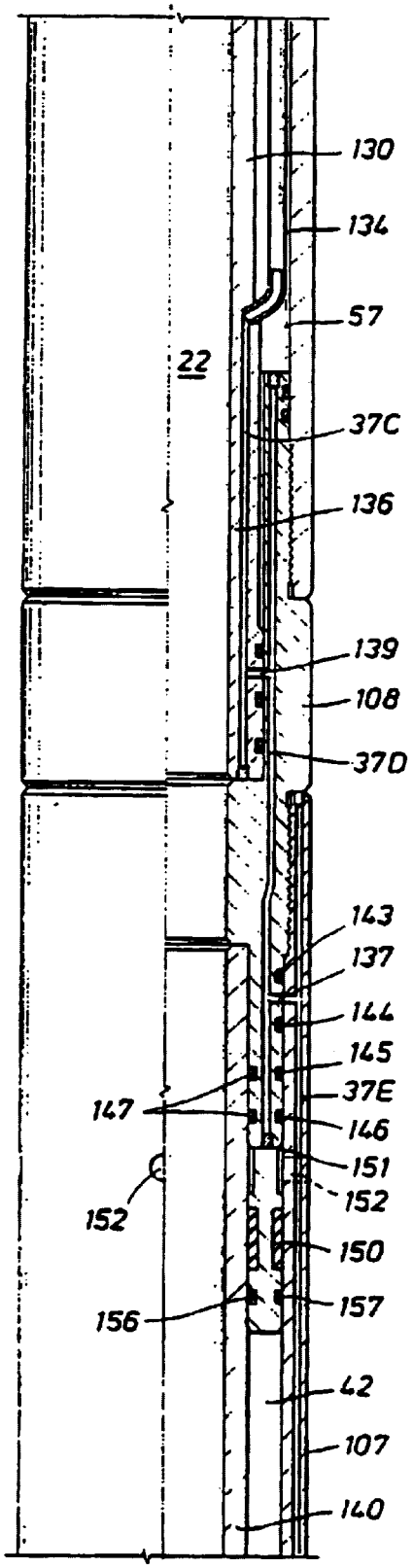
Figure 5D:
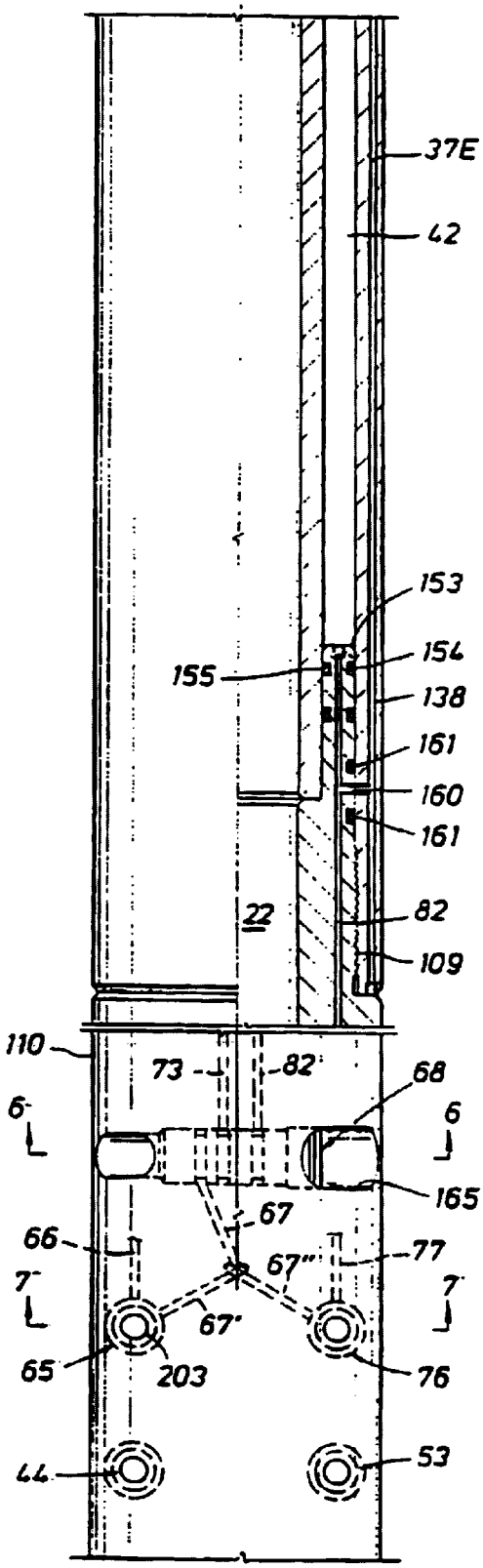
Figure 6:
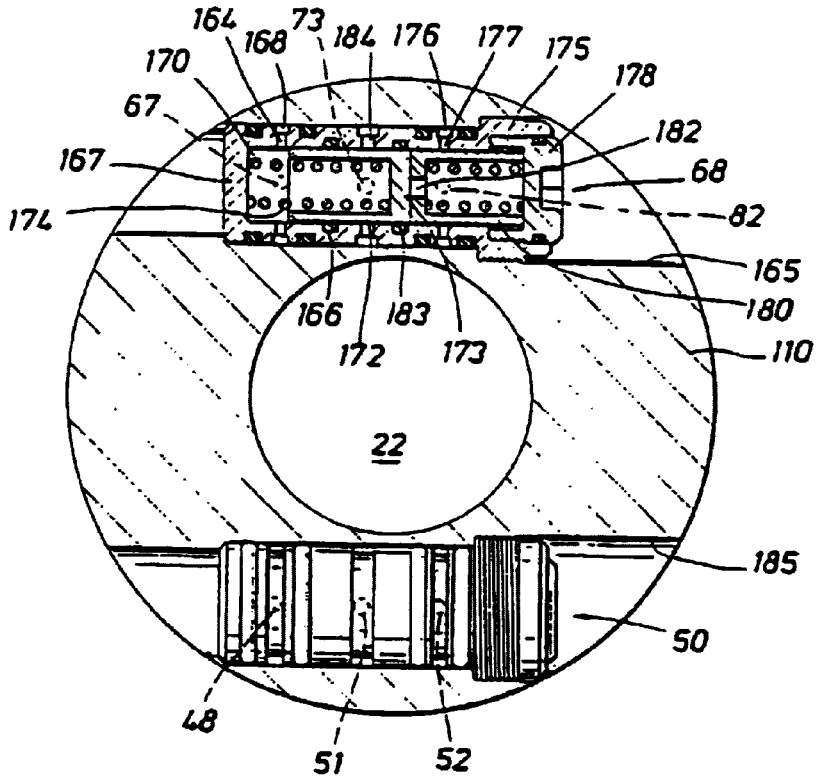
FIGS. 6 and 7 are transverse cross-sectional views taken on lines 6—6 and 7—7, respectively, of FIG. 5D.

As shown in FIG. 5D, the passage 37E crosses inward at ports 160 which are sealed by rings 161 to a vertical passage 82 that extends downward in the valve sub 110, and which intersects a transverse bore 165 that is formed in the wall of the sub 110. The bore 165 receives the pilot valve assembly 68 that has been described generally with reference to FIG. 2. As shown in detail in FIG. 6, the assembly 68 includes a cylinder sleeve 166 having an outer closed end 167. The cylinder sleeve 166 has an external annular recess 168 that communicates with the passage 67, and ports 169 to communicate the recess with the interior bore 170 of the sleeve. Seal rings are provided as shown to seal the cylinder sleeve 166 with respect to the bore 165. A cup-shaped shuttle piston 172 having a closed outer end 173 is sealingly slidable with respect to the cylinder sleeve 166, and a coil spring 174 urges the piston 172 outwardly of the sleeve 166. A tubular insert 175 which is threaded into the bore 165 in order to hold the cylinder sleeve 166 in place has an external annular recess 176 and ports 177 that communicate the body passage 82 with the interior of the insert 175. The outer end of the insert 175 is closed by a sealed plug 178. Various seal rings are provided, as shown, to seal the insert 175 with respect to the bore 165, and the inner end portion thereof with respect to the piston 172. A seal protector sleeve 180 is slidably mounted in the insert 175 and is urged toward the piston 172 by a coil spring 181. The sleeve 180 has a hole 182 as shown to permit free flow of oil. The leading purpose of the sleeve 180 is to cover the 0-ring 183 and keep it in its groove as the piston 172 moves rearward into the cylinder space 170. The inner end portion of the cylinder sleeve 166 can be slotted at 184 to permit free flow of oil through the passage 73 when the piston 172 moves from its closed position, as shown, to its open position where it is telescoped into the cylinder bore 170. The passage 73 is extended upward within the walls of the various component parts of the housing 100 to a location where its upper end opens into the dump chamber 57. This structure is not shown, but is similar to the manner in which the passage 37 is formed, except for being angularly offset therefrom. The other pilot valve assembly 50 described generally with reference to FIG. 2 is mounted in another transverse bore 185 in the wall of the valve sub 110 at the same level as the pilot assembly 68 as shown in FIG. 6. Since the assembly 50 is structurally identical to the assembly 68, a detailed description of the various parts thereof are not repeated to simplify the disclosure. The various passages which intersect the bore 185 are the cylinder passage 51, the supply passage 52 and the pilot pressure port 48.

Figure 7:
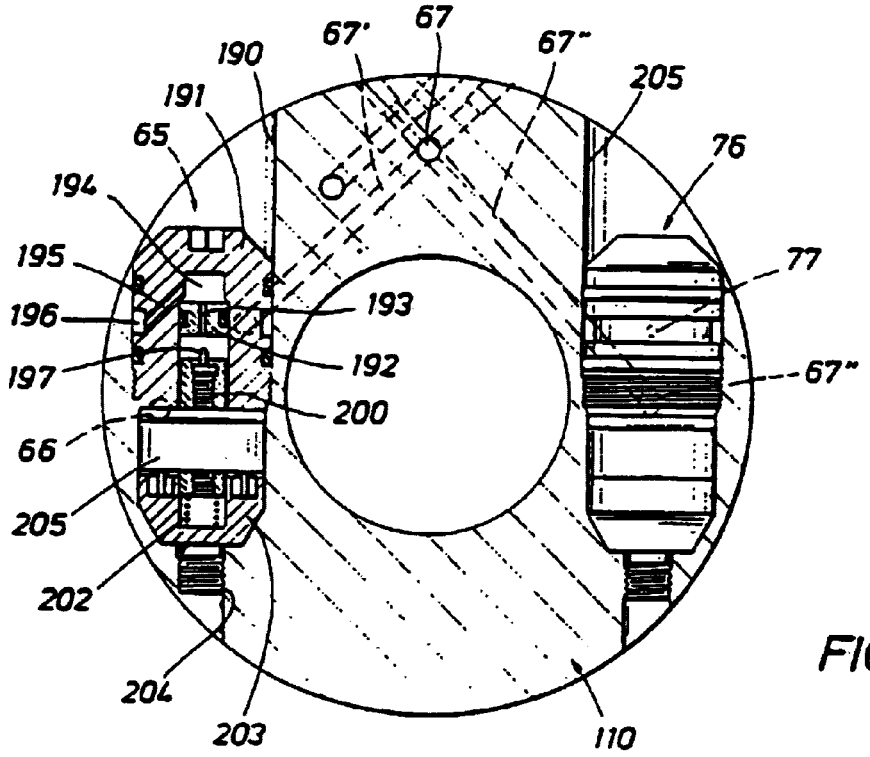

The pair of solenoid valves 65 and 76 that are operatively associated with the pilot valve 68 are mounted in transverse bores 190 and 205 in the wall of the sub 110 as shown in FIG. 7. The valve assembly 65 includes a sealed plug 191 that is threaded into the bore 190 as shown, the plug carrying an annular seat member 192 having a central port 193. The bore 194 of the plug 191 downstream of the port 193 is communicated by a passage 195 with an external annular groove 196 which is intersected by a passage 67' in the valve sub 110, which, as shown, communicates with the passage 67 which leads to the pilot valve 68. 0-rings at appropriate locations, as shown, seal against fluid leakage. The seat member 192 cooperates with a valve element 197 on the end of a plunger 200 to prevent flow through the port 193 when the element is forced against the seat member, and to permit such flow when the element is in the open position away from the seat member as depicted in FIG. 7. The plunger 200 is biased toward the seat member 192 by a helical spring 202 that reacts against the base of a conical mount 203 which is threaded into the sub 110 at 204. A coil 205 that is fixed to the mount 203 surrounds the plunger 200 and, when energized by electric current, causes the plunger 200 and the valve electric 197 to back away from the seat member 192 to the open position. When the coil 205 is not energized, the spring 202 forces the plunger and valve element to advance to the closed position where a conical end surface of the element engaged a tapered seat surface on the member 192 to close the port 193. The passage 66, as shown in phantom lines, feeds into the bore 190 upstream of the seat ring 192, and the passage 67' leads from the bore area adjacent the groove 196. The passage 66 leads upward in the housing 110 and into open communication with the high pressure chamber 42.

An identically constructed solenoid valve assembly 76 is mounted in a transverse bore 205 on the opposite side of the sub 110 from the assembly 65 as shown in FIG. 7, and therefore need not be described in detail again. The bore 205 is intersected by the passage 67" and 77 as shown, the passage 67" being another extension of the passage 67. The passage 67" intersects the bore 205 at a location upstream of the seat element of the valve assembly 76, whereas the passage 77 intersects the bore adjacent the external annular recess of the valve assembly which is downstream of the seat element. The passage 77 extends upward in the housing 100 to a location in communication with the dump chamber 57 shown in FIG. 5C.

The other pair of solenoid valve assemblies 44 and 53 which are operatively associated with the pilot valve 50 are mounted in bores identical to the bores 190 and 205, but at a different axial level in the sub 110 as shown near the bottom of FIG. 5D. Being identically constructed, these assemblies also are not shown or described in detail to simplify this disclosure. The respective bores in which the assemblies 44 and 53 are mounted are intersected by the passages 43, 47 and 56, 47', respectively, as described generally with reference to FIG. 2. Of course, appropriate electrical conductors lead to the respective coils of each of the solenoid valve assemblies 44, 53, 65, 76 through appropriately constructed bores, slots and high pressure feed-through connectors, (not shown) from the solenoid driver board 94 shown schematically in FIG. 3.

The cylinder passage 125 (FIG. 5B) which communicates with the region 126 below the piston 26 leads downwards to another group of control valve components including a pair of pilot valves, each of which is operatively associated with a pair of solenoid valves in the same arrangement as shown in FIG. 2. This group of elements is located in the sub 110 below the group shown near the bottom of FIG. 5D. Here-again the individual elements are not described in further detail to shorten and simplify the disclosure.

Figure 5E:
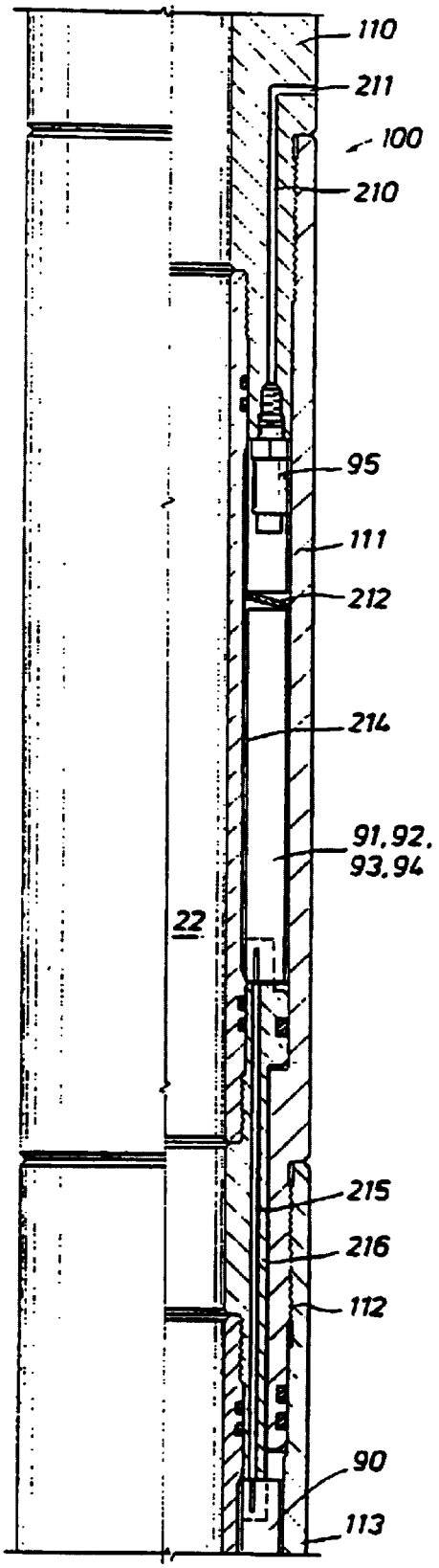
Figure 5F:
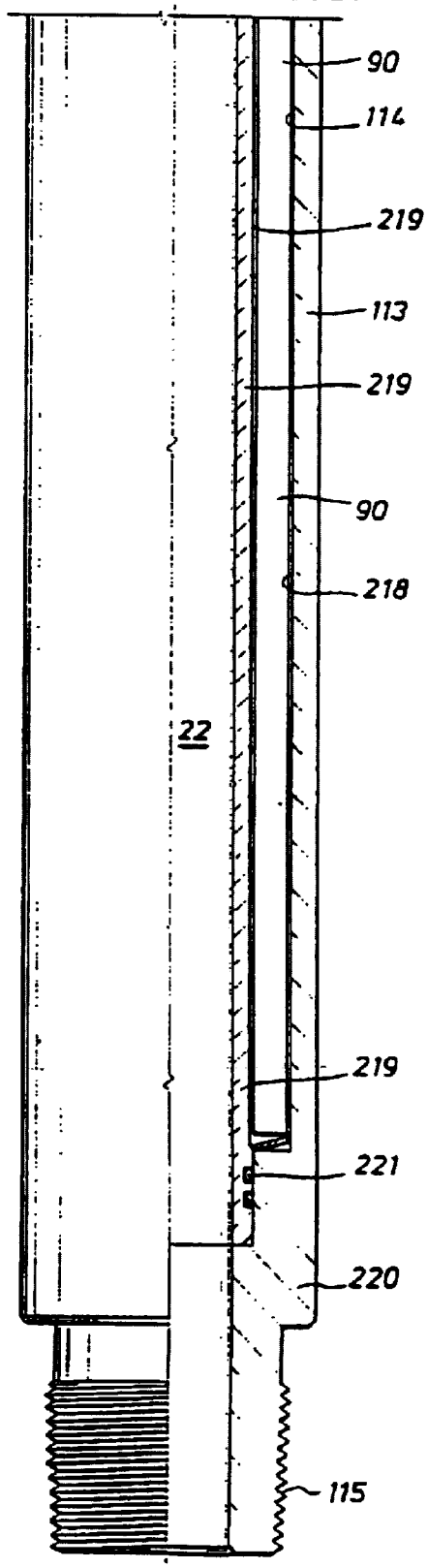

As shown in FIG. 5E, the pressure transducer 95 which is mounted near the lower end of the control sub 110 is communicated with the well annulus 13 outside the housing 100 by a vertical port 210 and a radial port 211, and thus is arranged to sense annulus pressure and to provide an output indicative thereof. An elongated annular cavity 212 is formed between the inner wall of the housing member 111 and the outer wall of a sleeve 214 whose upper end is threaded and sealed to the lower end portion of the sub 110 as shown. The annular cavity 212 receives the various circuit boards 91–94 shown in block diagram in FIG. 3, namely the receiver, controller, driver and power supply boards. Electrical conductors 215 which extend through a suitable channel in a tubular adapter 216 connect the power supply board 91 to one or more storage batteries 90 located in another cavity 218 near the lower end of the tool. The cavity 218, like the cavity 212, is formed between the housing member 113 and the outer wall of a central tube 219. The lower end of the sleeve 214, and the upper end of the tube 219 are threaded and sealed to the adapter 216 as shown. The lower end of the tube 219 is sealed against the lower portion 220 of the housing member 112 by rings 221 as shown in FIG. 5F. The entire housing assembly 100 has a central fluid passageway 22 that extends through the respective bores of the various tubes, sleeves, subs and housing members.

As previously mentioned with reference to FIG. 2, the actuator mandrel 24 is moved downward and upward with respect to the housing 21 in response to selective energization of the solenoid-operated valves. Where the present invention is embodied in a circulating valve 20 that functions to control communication between the passageway 22 and the well annulus 13, the associated valve element can take the form of a sliding sleeve which, as shown in FIG. 5A, is constituted by the upper section 220 of the actuator mandrel 24. The sleeve 220 carries an upper seal ring assembly 221 that, together with the seal ring 30, prevents flow through the side ports 102 in the housing sub 101 when the sleeve and actuator mandrel are in the upper position where the sleeve 220 spans the ports 102. In the lower position of the sleeve 220 and actuator 24, the ports 102 are opened to fluid flow, so that well fluids can be reverse circulated from the annulus 13 to the tubing or drill stem 12 by applying pressure to the well annulus 13 at the surface. There is positive feed-back of information from downhole that will confirm the opening of the ports 102, since a sudden or abrupt annulus pressure change will occur at the moment the ports open. This pressure change can be sensed at the surface by a suitable device on the pressure supply line 18.

If it is desirable to reclose the ports 102 so that other service work such as acidizing can be done in the well interval below the packer, another sequence of low level pressure pulses is applied at the surface to the annulus 13 via the line 18, which causes the controller 93 to signal the driver 94 to energize the solenoid valves 44 and 76, and to switch off the supply of current to the solenoid valves 53 and 65. When this occurs, the sleeve 220 and actuator 24 are shifted upward in response to high pressure acting on the lower face 34 of the piston 26, as previously described, to position the seal assembly 221 above the ports 102. The circulating valve 20 will remain closed until another command signal having a predetermined signature is applied to the annulus 13 to cause a downward movement of the mandrel 24.

Figure 8:
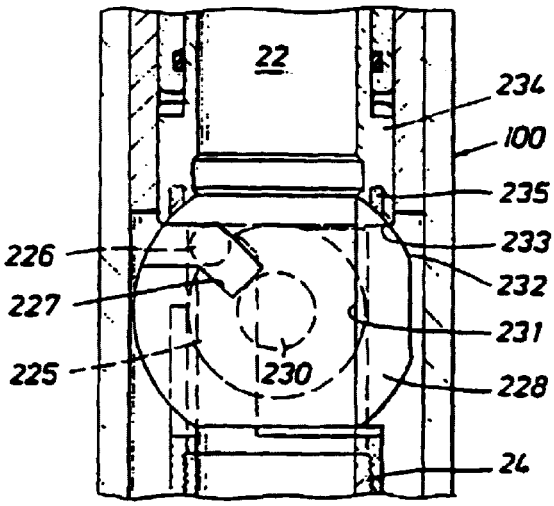
FIG. 8 is a sectional view of a tool string component including a ball valve element which can be used to control formation fluid flow through a central passage of a housing in response to operation of the control system of FIG. 3.

An embodiment of the present invention where a valve element is employed to control flow of fluids through the central passageway 22 is shown in FIG. 8. Here, the upper end of the actuator mandrel 24 is provided with a pair of laterally offset, upstanding arms 225 that carry eccentric lugs 226 which engage in radial slots 227 in the outer side walls of a ball valve element 228. The ball valve 228 rotates about the axis of trunnions 230 on its opposite sides between an open position where the throughbore 231 of the ball element is axially aligned with the passageway 22, and a closed position where the spherical outer surface 232 thereof engages a companion seat 233 on the lower end of a seat sleeve 234. In the closed position, a composite seal ring assembly 235 prevents fluid leakage. On command as previously described, the mandrel 24 is moved upward and downward to correspondingly open and close the ball element 228. Positive feedback of the position of the ball element 228 is obtained at the surface through appropriate monitoring of pressure in the tubing 11. The use of a ball element 228 provides a valve structure that presents an unobstructed vertical passage through the tools in the open position, so that other well equipment such as string shot, perforating guns and pressure recorders can be lowered through the tool string on wireline. The ball element 228 also provides a large flow area in the open position, which is desirable when testing certain types of wells. The ball element 228 can function as the main test valve, a safety valve, or as a part of a sampler as will be apparent to those skilled in the art.

OPERATION

In operation, the valve and operating system is assembled as shown in the drawings, and the chamber 42 is filled with a suitable hydraulic oil until the floating piston 150 is at the upper end of the chamber as shown in FIG. 5C. The chamber 42 then can be pressurized somewhat to cause the shuttle 60 to open so that the lines 52, 51 and 38 are filled with oil, after which the solenoid valves 44 and 65 are temporarily opened to permit lines 43, 47 and 48, and the lines 66 and 67, to also fill with oil. The dump chamber 57 initially contains only air at atmospheric pressure. The actuator mandrel 24 is in its upper position where the circulating ports 102 are closed off by the mandrel section 220, and is held in such upper position by the return spring 32, if used as shown in FIG. 2. In the actuator embodiment shown in FIG. 5B, the mandrel will remain in the upper position due to seal friction, since the mandrel has an otherwise pressure-balanced design. The assembly 20 then is connected in the tool string, and lowered therewith into the well bore to test depth. As the tools are run, the piston 150 transmits hydrostatic pressure to the oil in the chamber 42, so that oil pressure in the chamber is substantially equal to hydrostatic pressure of fluids in the annular 13 at all times.

At test depth the tool string is brought to a halt, and the packer 12 is set by appropriate pipe manipulation to isolate the well interval below it from the column of well fluids standing in the annulus 13 thereabove. To initiate a test, the main valve 14 is opened for a brief flow period to draw down the pressure in the isolated interval of the well bore, and then closed for a shut-in period of time during which fluid pressures are permitted to build up as formation fluids hopefully come into the borehole below the packer. The pressure recorders 16, 17 operate to provide chart recordings of pressure versus time elapsed during the test. If desired, suitable known instrumentalities can be used to provide a readout of data at the surface during the test.

To clear the pipe string 11 of formation fluids recovered during the test, the circulating valve 20 is opened in the following manner. A command signal constituted by a series of low level pressure pulses each having a specified duration is applied at the surface via the line 18 to the fluids standing in the well annulus 13. The pressure pulses are sensed by the transducer 95, whose output is coupled to the amplifier or receiver 92. The receiver 92 converts the low level electrical signals from the transducer 95 into an electrical signal having a certain format. The formatted signal is interrogatoried by the controller 93 to determine if electrical signals representing the command signal signature are present, or not. If such is the case, the controller 93 triggers operation of the solenoid driver [99] *94*, whereby selected pairs of the solenoid valves are supplied with current. Thus the actuator mandrel 24 is moved upward or downward on command from the surface. With pair 53, 65 energized, low pressure in the dump chamber 57 is communicated to the rear of the pilot valve shuttle 60, which causes it to shift open, whereby hydrostatic pressure of the oil in chamber 42 is applied to the upper face 40 of the actuator piston 26. Energization of the solenoid valve 65 ensures that pressures are balanced across the shuttle 70 so that its spring 74 retains it closed across the line 73. The difference between hydrostatic fluid pressure and atmospheric pressure thus is applied to the actuator piston 26 which produces downward force to drive the actuator mandrel 24 downward against the bias of the return spring 32. Such movement positions the valve seal assembly 221 below the side ports 102 in the housing 21 and after a suitable time delay to insure complete travel of the mandrel 24, the solenoid valves 53 and 65 are de-energized by the driver 94 in response to signals from the controller 93. Pressure then can be applied to the annulus 13 at the surface cause any fluids in the pipe string 11 to be reverse circulated to the surface where they can be piped to a suitable container for inspection and analysis, or disposed of if desired. If the test is to be terminated at this point, the packer 12 is unseated and the tool string withdrawn from the well so that the pressure recorder charts also can be inspected and analyzed If further testing or other service work is to be done without removing the equipment from the well, the circulating valve 20 is reclosed. To accomplish this, another series of low level pressure pulses is applied at the surface to the fluids in the well annulus. Such pulses activate the controller 93 as described above, which causes the driver 94 to energize the other pair of solenoid valves 44, 76. Opening of the solenoid valve 44 equalizes pressures across the pilot valve shuttle 60, so that its spring 63 forces the shuttle closed across the line 51. The solenoid valve 53, when no longer energized, moves to its normally closed position against the seat 55. Opening of the solenoid valve 76 reduces the pressure on the spring side of the pilot shuttle 70, whereby pressure in the line 82 shifts the shuttle to open position where communication is established between line 82 and dump line 73. Of course the solenoid valve 65, when not energized, moves to its normally closed position. The return spring 32 forces the actuator mandrel 24 upward, displacing that volume of oil in the chamber region 36 into the dump chamber 57. By repeated applications of command signals to the fluids in the annulus 13, the circulating valve 20 can be repeatedly opened and closed.

Cycles of downward and upward movement of the actuator mandrel 24 also can be used to rotate the ball element 228 shown in FIG. 8 between its open and closed positions with respect to the flow passage 22. Thus a ball valve in combination with the control system of the present invention can be used as the main test valve 14, or as a sampler safety valve apparatus. Each valve component is the test string can have its own control system, which is operated in response to a command signal having a different signature. Also, one control system can be used to operate a number of different valve components with the driver 94 arranged to control the energization of a plurality of pairs of solenoid valves associated with respective valve components.

B. Multiple Well Tool Control Systems In A Multi-Valve Well Testing System

Referring to FIG. 9, a borehole 10 is illustrated, as in FIG. 1, and a well testing tool 11 is disposed in the borehole. For purposes of this discussion, the tool includes a test valve section 20 and a reversing valve section 14. All other numerals shown in FIG. 9 are identical to the numerals shown in FIG. 1. It should be understood that a test valve and a reversing valve were indicated in the drawing for purposes of illustration only. The present invention would work equally well in conjunction with other valves, such as safety valves, samplers, safety joints, etc. In addition, the multiple well tool control system can be used for controlling more than two valves.

For purposes of this discussion, the well testing tool 11 of the preferred embodiment includes an electronics section, a first well tool control system connected to the electronics section, the test valve connected to the first well tool control system, a second well tool control system connected to the electronics section, and the reversing valve connected to the second well tool control system.

Figure 10:
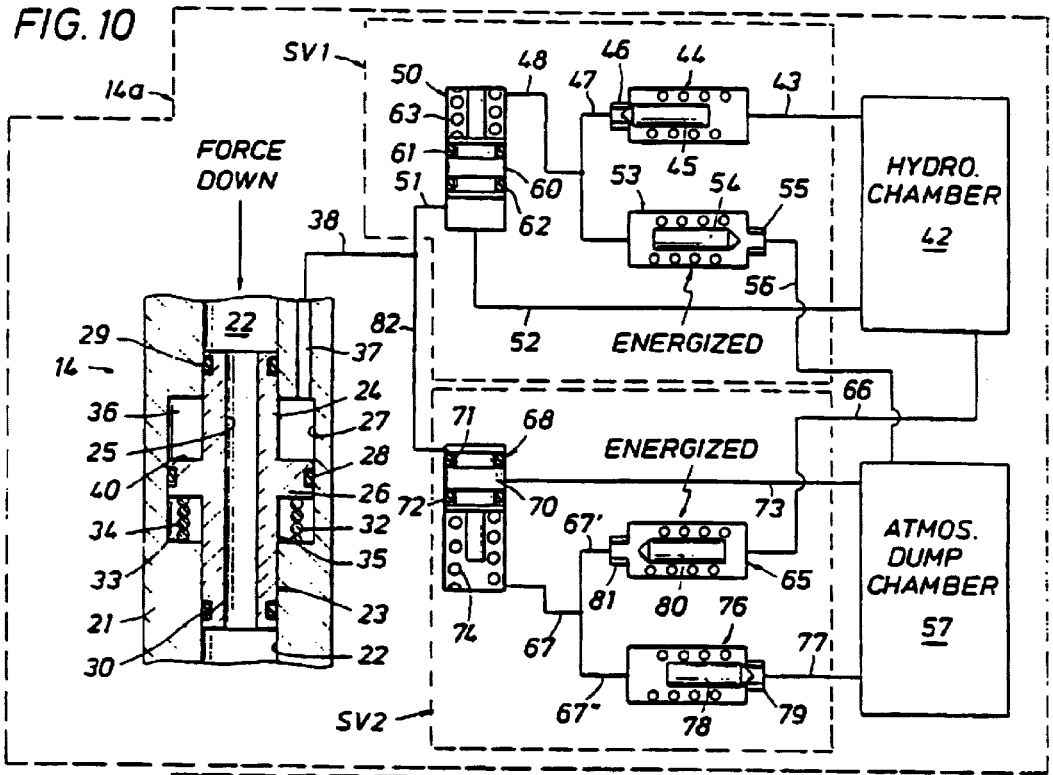
FIGS. 10–11 illustrate two respective well tool control systems for controlling two corresponding valves shown in FIG. 9, each control system comprising the hydraulic components of FIG. 2.

Referring to FIG. 10, the first well tool control system 14a disposed in the well testing tool of FIG. 9 includes the reversing valve 14 to which is connected a first set of solenoids SV1, and a second set of solenoids SV2 in the manner as described in part A above entitled "WELL TOOL CONTROL SYSTEM".

Figure 11:
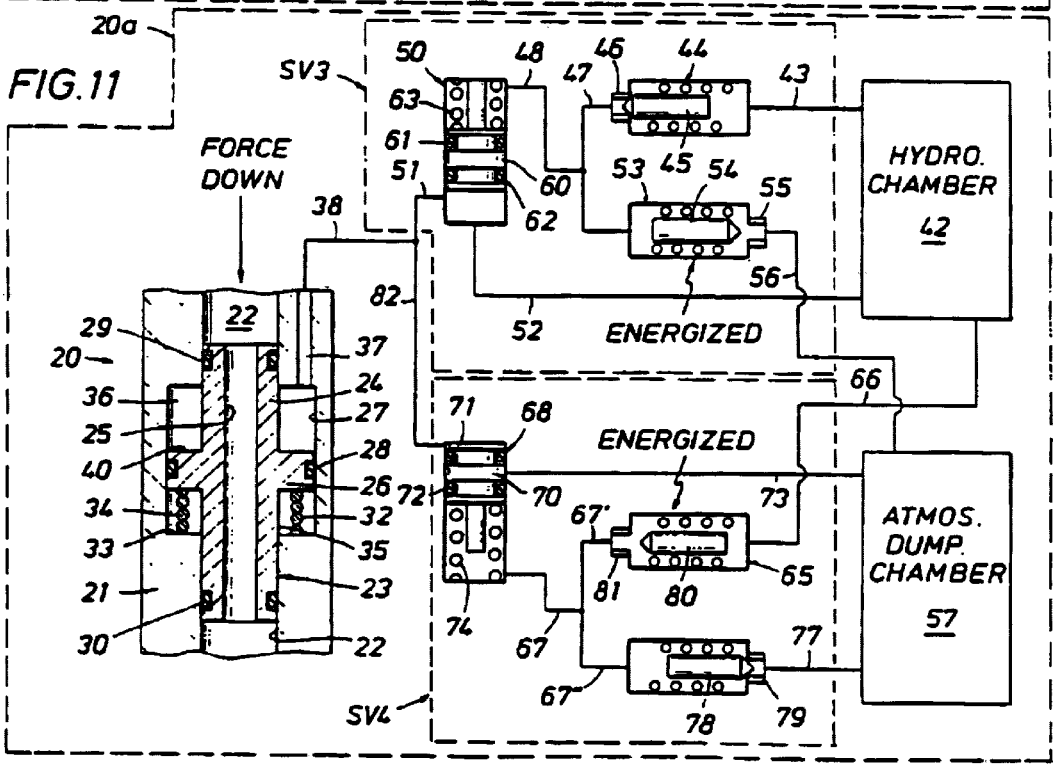

Referring to FIG. 11, the second well tool control system 20a disposed in the well testing tool of FIG. 9 includes a test valve 20 to which is connected a third set of solenoids SV3 and a fourth set of solenoids SV4 in the manner as described in part A above.

Referring to FIG. 12, the solenoids SV1, SV2, SV3 and SV4 are connected to the electronics section also disposed in the well testing tool of FIG. 9. The electronics section comprises a command sensor 95, a command receiver board 92, a controller board 93 which contains an Intel 8088 microprocessor, a power supply 91 connected to the controller board 93, a battery 90 connected to the power supply, and a solenoid driver board 94 connected to the output of the controller board 93.

The solenoid driver board 94 is energized by a controller board 93. The controller board comprises a processor portion and a memory portion in which a set of microcode may be encoded. The controller board is powered by power supply board 91 and receives unique signature input signals from the command receiver board 92. The command receiver board 92 receives an input stimulus from a command sensor 95, which input stimulus may be an output signal from an annulus pressure transducer, a strain gauge or a bottom hole pressure transducer. The command sensor 95 may sense various types of input stimuli, such as changes in pressure within the annulus around the tool. The preferred embodiment will utilize changes in pressure within the annulus as the input stimulus to the command sensor 95, but only for purposes of illustration, since any type of input stimulus to command sensor 95 will suffice for purposes of the present invention. A first pressure change signal, having a first predetermined signature, transmitted into a borehole by an operator would be sensed by the command sensor 95 and interpreted by the controller board 93 as an intent to control the test valve 20, whereas a second pressure change signal, having a second predetermined signature, transmitted into the borehole by an operator, would be sensed by the command sensor 95 and interpreted by the controller board 93 as an intent to control the reversing valve 14.

Referring to FIG. 13a, a typical input stimulus for command sensor 95 is illustrated, the stimulus being a pressure change signal transmitted into the borehole by an operator at the well surface for purposes of energizing one of the solenoid sets SV1/SV2 or SV3/SV4. In FIG. 13a, two pressure signals are shown, P-1 and P-2, each having the same predetermined signature. The first pressure signal P-1 has a pulse width of T-1 and has an indicated pressure P. The second pressure signal P-2 has a pulse width T-2 and has the same indicated pressure P. The second pressure signal P-2 is transmitted into the borehole only for purposes of ensuring that the command sensor 95 accurately recognizes the pressure signal P-1 as being associated with the one solenoid set (either SV1/SV2 or SV3/SV4) and that a random pressure change in the borehole annuls is not recognized. When the pressure signal P-1 is transmitted into the borehole, followed by pressure signal P-2, the command sensor 95 recognizes the P-1 pulse as applying to one of solenoid sets SV1/SV2 or SV3/SV4 and energizes the microprocessor within the controller board 93. If pressure signal P-2 does not follow immediately after pressure signal P-1, the command sensor 95 will not energize controller board 93. As a result, random pressure changes in the borehole annulus will not activate the command sensor 95 and inadvertently open a valve. When the controller board 93 is energized, the controller board 93, via solenoid driver board 94, selects and energizes a particular solenoid set (either SV1/SV2 or SV3/SV4), as identified by pressure signal P-1 (or P-2), and would either open normally closed solenoid 44, and open normally closed solenoid 76, or would open normally closed solenoid valve 53 and open normally closed solenoid valve 65 of the selected solenoid set. As a result, the mandrel 24 of well tool control system 14a or 20a would move up or down in FIG. 9, thereby opening or closing its corresponding valve.

The functional operation of the multiple well [too] *tool* control systems of the present invention is set forth in the following paragraphs with reference to FIGS. 9 through 13a of the drawings.

Each individual well tool control system, shown in FIG. 10 and FIG. 11, functions in the manner described in part A of this specification entitled WELL TOOL CONTROL SYSTEM. An operator at the well surface decides that the reversing valve 14 must be opened. He transmits a pressure signal downhole, similar to the pressure signal illustrated in FIG. 13a. The pressure signal has a unique, predetermined signature, uniquely associated with the reversing valve 14. The command sensor 95 detects the first pulse of the pressure signal. The command receiver board 92 transforms the pressure signal detected by the command sensor 95 into a signal uniquely recognizable by the microprocessor in the controller board 93. The microprocessor used in the preferred embodiment is an Intel 8088 microprocessor, which microprocessor interprets the signal from the command receiver board 92 as one uniquely associated with the well tool control system 14a of FIG. 10. As a result, the microprocessor in the controller board 93 instructs the solenoid driver board 94 to energize the solenoid sets SV1 and SV2 of well tool control system 14a in a manner which will move mandrel 24 of reversing valve 14 downwardly in FIG. 9 and open the reversing valve 14. This action has no effect on the test valve 20, the operation of the reversing valve 14 being totally independent of the operation of the test valve. In fact, the operator need only know which pressure signal to transmit downhole in order to open or close the reversing valve 14; he need not be concerned about the test valve 20; he need not know whether there is one or more than one well testing tool disposed downhole and he need not know in which well testing tool the reversing valve 14 is disposed. When the operator desires to open the test valve 20, he transmits another pressure signal downhole, similar to the pressure signal illustrated in FIG. 13a, but different than the pressure signal transmitted downhole associated with the reversing valve 14. The test valve 20 pressure signal pulse width and/or amplitude is changed relative to the reversing valve 14 pressure signal pulse width and/or amplitude. Again, the command sensor 95 senses the [existance] *existence* of the new test valve 20 pressure signal and the command receiver board 92 converts this new pressure signal into another signal which is uniquely recognizable by the controller board 93 as being associated with the test valve 20, and not the reversing valve 14. As a result, the solenoid driver board 94 energizes solenoid set sets SV3 and SV4 associated with well tool control system 20a, causing mandrel 24 of test valve 20 to move downwardly in FIG. 9 thereby opening the test valve 20. Again, the opening of the test valve 20 is done totally independently of the reversing valve 14; and the operator need only know the identity of the particular pressure signal which opens the test valve 20; he need not know in which well testing tool the test valve 20 is disposed or even if there is more than one such tool disposed downhole.

Referring to FIG. 14, a well testing tool is illustrated including, for purposes of this discussion, two valves, and a well tool control system connected to each valve.

In FIG. 14a, a top part of the well testing tool is illustrated and includes a threaded portion for connection to the tubing string disposed in the borehole.

Figure 14B:
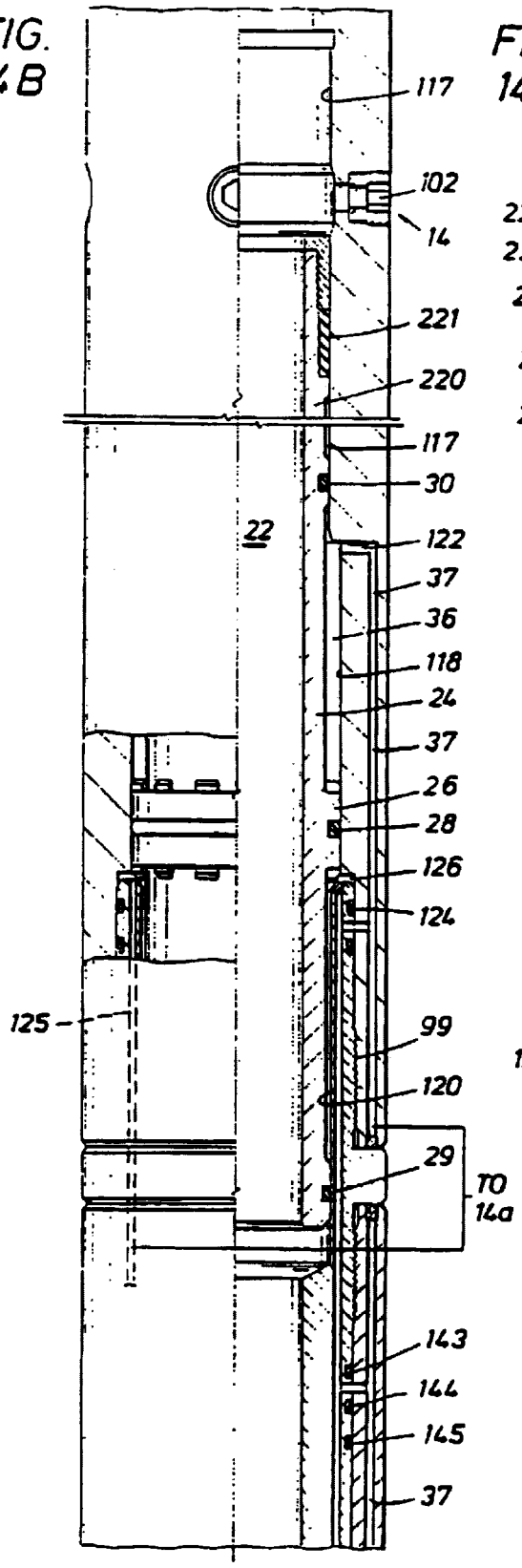

In FIG. 14b, a first valve (valve 1) 14 is illustrated, this valve representing the reversing valve 14 shown in FIGS. 9 and 10. The valve 14 includes circulating ports 102 which open or close depending upon the position of mandrel 24 in the tool. If mandrel 24 is moved upwardly in the figure, ports 102 close, whereas if mandrel 24 moves downwardly, ports 102 open. Mandrel 24 moves up and down depending upon the pressure of fluid on the top and bottom surface of the piston 26 portion of the mandrel 24. Fluid is conducted to the top surface of piston 26 via cylinder region 36, port 122, and oil passage 37. Oil passage 37 is connected to pilot valves 50 and 68 via lines 38, 51, and 82 of well tool control system 14a of FIG. 10. Fluid is conducted to the bottom surface of piston 26 via another oil passage 125. The other oil passage 125 conducts fluid under pressure to the bottom surface of piston 26 and represents spring 32 shown in FIG. 10. The bias force of spring 32 in FIG. 10 provides the same pressure to the bottom surface of piston 26 as does the pressure of the fluid in oil passage 125 in FIG. 14b.

In operation, referring to FIG. 14b, when fluid under pressure is provided to the top surface of piston 26 via cylinder region 36, port 122, and oil passage 37, from well tool control system 14a shown in FIG. 10, such pressure is greater than the pressure provided to the bottom surface of piston 26 via oil passage 125; therefore, piston 26 moves downwardly in FIG. 14b, causing mandrel 24 to move out from between circulating ports 102, opening said ports. Fluid under pressure is provided to the top surface of piston 26 via cylinder region 36, port 122, and oil passage 37 in the following manner: an operator at the well surface transmits an input stimulus into the borehole, such as a pressure signal as shown in FIG. 13a; command sensor 95 detects the input stimulus, and command receiver board 92 converts the stimulus into a signal recognizable by the microprocessor in the controller board 93 as uniquely associated with valve 14 of FIG. 14b; controller board 93, via solenoid driver board 94, energizes solenoid sets SV1 and SV2 of the well tool control system 14a in FIG. 10 in a first predetermined manner as described in PART A of this specification thereby permitting oil in the hydro chamber 42 of FIG. 10 to be transmitted to the top surface of piston 26 in FIG. 14b. When solenoid sets SV1 and SV2 of the well tool control system 14a in FIG. 10 are energized in a second predetermined manner as set forth in PART A of this specification in response to another input stimulus transmitted into the borehole by an operator, the oil above piston 26 in FIG. 14b is permitted to drain to dump chamber 57 of FIG. 10.

Figure 14C:
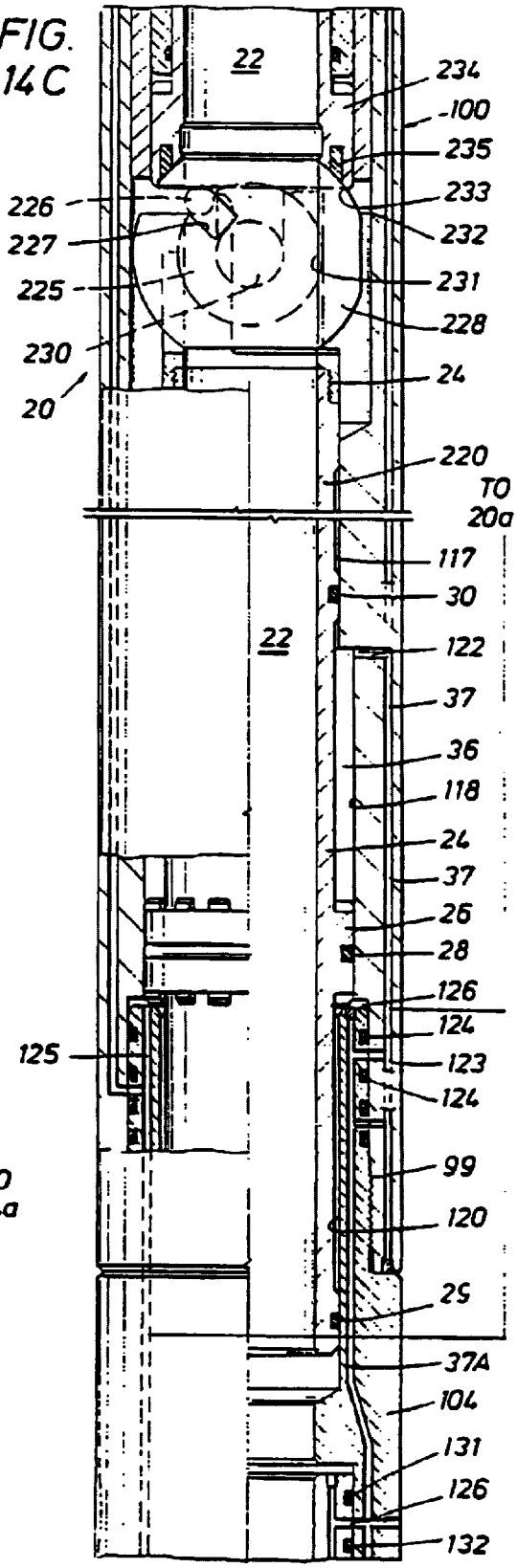

In FIG. 14c, a second valve (valve 2) 20 is illustrated, this valve representing the test valve 20 shown in FIGS. 9 and 11. The valve 20 includes ball valve 228 which opens or closes depending upon the position of mandrel 24 in the tool of FIG. 14c. If mandrel 24 is moved upwardly in the figure, ball valve 228 opens, whereas if mandrel 24 moves downwardly, ball valve 228 closes (see the description in this specification associated with FIG. 8 of the drawings). Mandrel 24 moves up and down depending upon the pressure of fluid on the top and bottom surface of the piston 26 portion of the mandrel 24. Fluid is conducted to the top surface of piston 26 via cylinder region 36, port 122, and oil passage 37. Oil passage 37 is connected to pilot valves 50 and 68 via lines 38, 51, and 82 of well tool control system 20a of FIG. 11. Fluid is conducted to the bottom surface of piston 26 via another oil passage 125. The other oil passage 125 conducts fluid under pressure to the bottom surface of piston 26 and represents spring 32 shown in FIG. 11. The bias force of spring 32 in FIG. 11 provides the same pressure to the bottom surface of piston 26 as does the pressure of the fluid in oil passage 125 in FIG. 14c.

In operation, referring to FIG. 14c, when fluid under pressure is provided to the top surface of piston 26 via cylinder region 36, port 122, and oil passage 37, from well tool control system 20a shown in FIG. 11, such pressure is greater than the pressure provided to the bottom surface of piston 26 via oil passage 125; therefore, piston 26 moves downwardly in FIG. 14c, causing mandrel 24 to rotate ball valve 228 thereby closing valve 20 of FIG. 14c. Fluid under pressure is provided to the top surface of piston 26 via cylinder region 36, port 122, and oil passage 37 in the following manner: an operator at the well surface transmits another input stimulus into the borehole, such as a pressure signal as shown in FIG. 13a, which input stimulus or pressure signal is different than the input stimulus transmitted previously into the borehole when it was desired to open valve 14 of FIG. 14b. Command sensor 95 detects the input stimulus, and command receiver board 92 converts the stimulus into a signal recognizable by the microprocessor in the controller board 93 as uniquely associated with valve 20 of FIG. 14c; controller board 93, via solenoid driver board 94, energizes solenoid sets SV3 and SV4 of the well tool control system 20a in FIG. 11 in a first predetermined manner, as set forth in PART A of this specification, thereby permitting oil in the hydro chamber 42 of FIG. 11 to be transmitted to the top surface of piston 26 in FIG. 14c. When solenoid sets SV3 and SV4 are energized in a second predetermined manner as set forth in PART A of this specification in response to transmission of another input stimulus into the bor hole by an operator, the oil above piston 26 in FIG. 14c is permitted to drain to dump chamber 57 in FIG. 11.

FIG. 14d represents the bottom portion of the well testing tool shown in FIGS. 14a through 14c.

C. Multiple Well Tool Control Systems In A Multi-Valve Well Testing System Having Automatic Control Modes By incorporating suitable microcode into the controller board 93, the well tool control system of part B presented hereinabove may operate automatically, opening and closing various valves in the tool a predetermined number of times and in a predetermined sequence, in response to a single input kickoff stimulus. The input stimulus may, for example, be a sensing of a predetermined bottom hole pressure, in the borehole below the packer, and a generation of the proper input stimulus when the bottom hole pressure exceeds a predetermined level. When the input stimulus is generated, the pre-programmed series of instructions generated by the controller board 93 microcode may, for example, require that the well be flowed for 5 minutes, followed by a shut-in until stabilized pressure is reached, followed by flowing the well until the well appears to be killing itself, followed by shut-in until the Horner straight line is reached, followed by opening a reversing valve. The input stimulus may also be a sensing of a specific set down weight of the tool in the borehole when the tool reaches bottom, via a strain gauge placed on the tool, and a generation of an input stimulus when the set down weight reaches a predetermined amount. In response to the input stimulus representative of the specific set down weight of the tool, a specific action would be taken, such as opening a test valve for 5 minutes, then closing the valve for 1 hour, then opening the valve for 1 hour, then closing the valve for 2 hours, after which a reversing valve would open.

The exact sequence of valve openings and closings, and the exact number of times the valves are opened and closed per hour, is determined by the specific instructions encoded into the controller board memory chip. A flow chart of the microcode instructions is presented hereinbelow.

Figure 15:
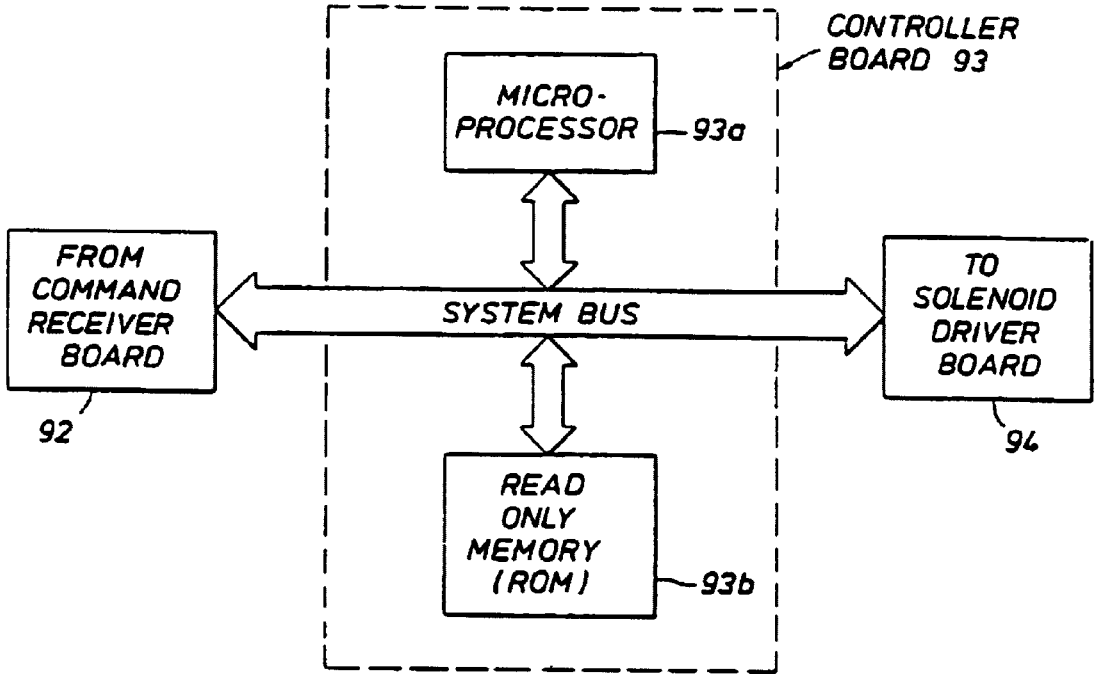
FIG. 15 illustrates a more detailed construction of the controller board 93 shown in FIG. 12.

Referring to FIG. 15, a construction of the controller board 93 of FIG. 12 is illustrated.

In FIG. 15, the controller board 93 includes a microprocessor 93a connected to a system bus and a read only memory (ROM) 93b also connected to the system bus. The microprocessor may be any typical microprocessor chip, such as the Intel 8088 microprocessor chip used in conjunction with this preferred embodiment of the present invention. The ROM 93b is pre-programmed (encoded) with certain specific microcode instructions. These instructions determine the exact sequence by which the valves in the well testing tool of part A are opened and closed, and determine the number of times such valves are opened and closed per hour.

Figure 16:
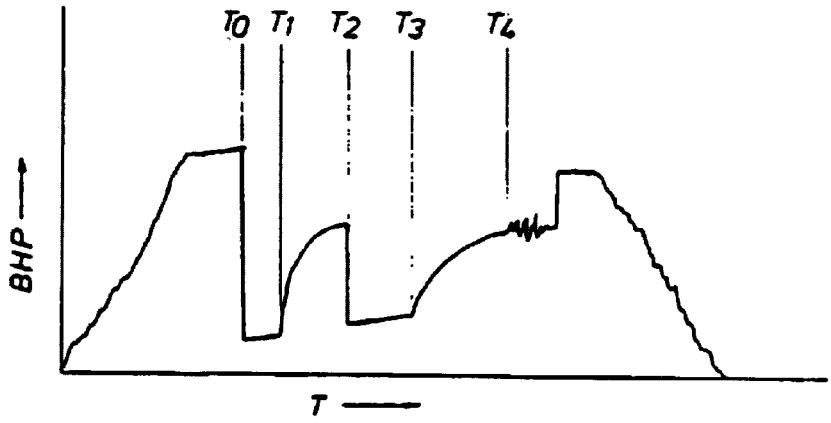
FIG. 16 illustrates a sketch of a typical bottom hole pressure vs time plot.

Referring to FIG. 16, a plot of typical bottom hole pressure vs time is illustrated. This plot identifies and defines the times To, T1, T2, T3, and T4 used below during the discussion of the microcode instruction flow chart of FIG. 19.

Referring to FIG. 17, a pressure transducer section 95a includes pressure transducer 95 to which an electrical cable 95b is connected, for further connection to the command receiver board 92. The pressure transducer 95 is ported to the inside of the tubing string, below the packer, via channels 210 and 210a, so that the bottom hole pressure, below the packer, may be sensed by the pressure transducer 95. When the bottom hole pressure is sensed by pressure transducer 95, the transducer 95 generates an output signal which energizes the command receiver board 92 thereby acting as an input stimulus to controller board 93 for initiating the execution of the controller board 93 microcode, stored in ROM 93b of FIG. 15.

Referring to FIG. 18, in lieu of the pressure transducer section 95a shown in FIG. 17, a strain gauge section 95c may be substituted for the pressure transducer section. The strain gauge section of the tool shown in FIG. includes a strain gauge 95d integrally connected to the body of the well testing tool. An electrical cable 95e is connected to the strain gauge for further connection to the command receiver board 92. The strain gauge 95d senses the set down weight of the well testing system of part B of this application, when such system sets down in the borehole. In response to the sensing of the set down weight, the strain gauge 95d generates an output signal which energizes the command receiver board 92, thereby acting as an input stimulus to controller board 93 for initiating the execution of the controller board 93 microcode, stored in ROM 93b of FIG. 15.

Figure 19B:
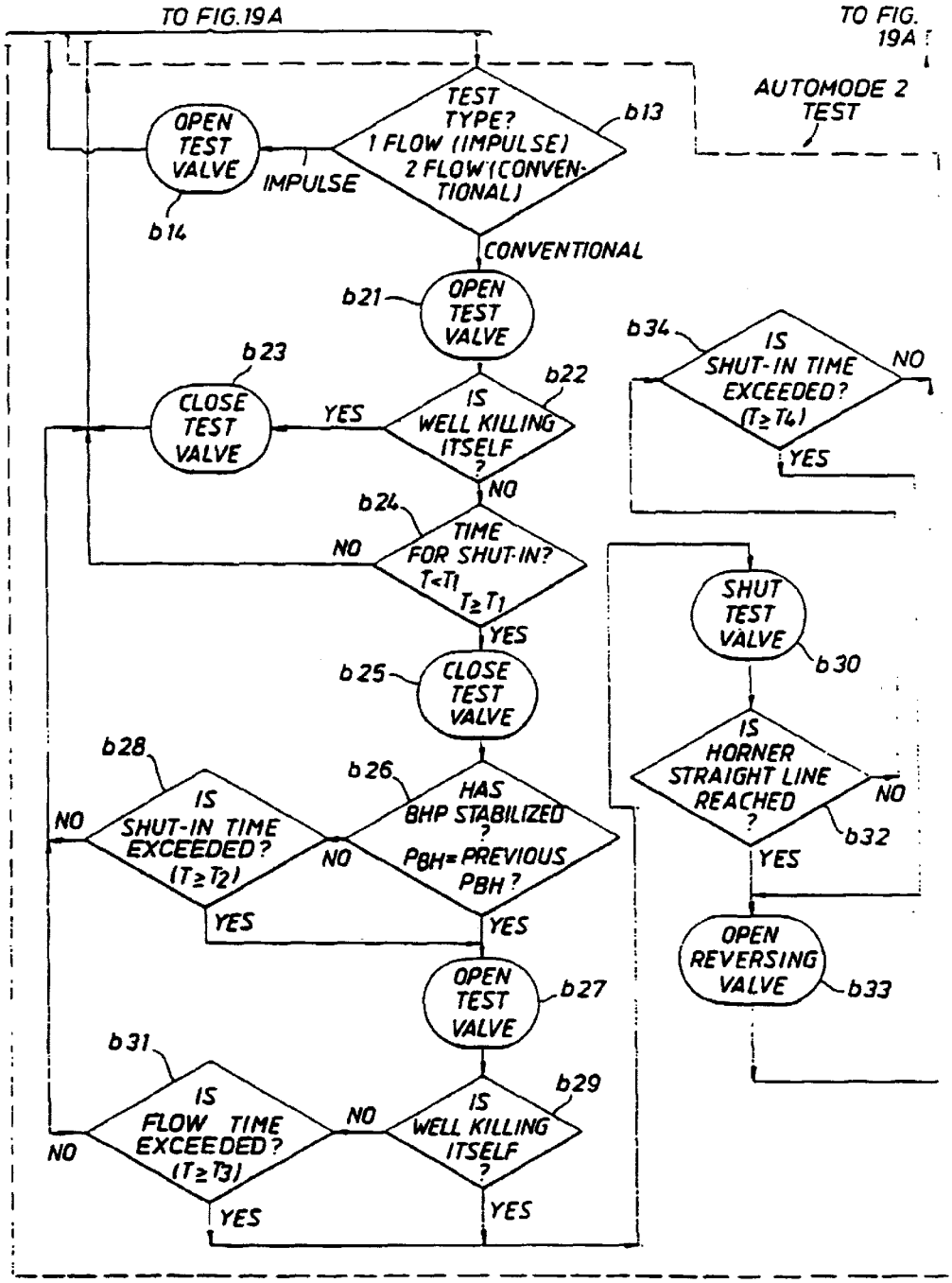
FIG. 19 illustrates a flow chart of the microcode resident in the memory chip shown in FIG. 15.

Referring to FIG. 19, a flowchart of the microcode encoded in the ROM 93b of the controller board 93 is illustrated. A complete discussion of the flowchart of figure 19 will be presented hereinbelow. This discussion will identify and ear plain each block of the flowchart and will set forth a functional description of the present invention.

The invention of this application is a system which includes a processor portion (e.g., the Intel 8088 microprocessor) and a memory portion (ROM 93b), the memory storing certain instructions therein. When the instructions stored in the memory portion are executed by the processor portion, certain specific functions are performed by the system. In FIG. 19, the microcode stored in ROM 93b begins with START (block b1), and, as indicated in block b2, asks the question "Is T>T sleep?". T sleep is defined as being the length of time, from initialization of the microprocessor clock at the surface, during which no input stimulus is received by the microprocessor and certain control components are temporarily shut down to conserve battery energy and reduce the chance for inadvertent tool or system operation. In other words, Tsleep is the length of time during which the well testing tool or system is being disposed down the borehole of an oil well for eventual testing operations. If not, return to the beginning of block b2 and begin again. Otherwise, if yes, ask "Is override received?" (block b3). Override is a signal transmitted to the tool by the operator at the surface and would act as an interrupt to halt any further operations by the multiple well tool control systems of PART B in accordance with the present invention. Note that all the microcoded operations set forth in FIG. 19 eventually loop back to the top of the flowchart, where the question "Is override received" is asked once again. Override is important since it may be necessary to revert to manual operation, as set forth in PART A of this specification, for manually transmitting an input stimulus into the borehole, or it may be necessary to manually change the set down weight which would trigger an output signal from the strain gauge 95d. Furthermore, the time T is always incremented, as the microcode of FIG. 19 is executed; as a result, override may be selected at any time by an operator thereby interrupting any further execution of the microcode in ROM 93b by the processor 93a. If override is received by the processor 93a of the controller board 93, ask "is stop override received?" (block b4). If yes, stop operations immediately. If no, "perform the override function" (block b5) and return to block b3 and ask, once again, "is override received". If not, the microcode asks "is kickoff received?" (block b6). If not, return to the beginning of block b3. "kickoff" is defined as the input stimulus mentioned above, such as the output signal from the strain gauge or the output signal from the pressure sensor sensing the bottom hole pressure. If the kickoff signal (input stimulus) is received, the microcode asks "is automode 1 set?" (block b7). Automode 1 is a preprogrammed test wherein a certain time sequence of openings and closings of a test valve and a reversing valve is preprogrammed into the ROM as a part of the ROM microcode. For example, the processor 93a, in response to execution of the automode 1 test microcode stored in ROM, will alternately open and close the test valve until a predetermined time is reached; when the predetermined time has elapsed, the processor 93a will open the reversing valve.

The following is a description of the automode 1 test.

If automode 1 is set, a series of questions are asked by the ROM microcode (block b8): "is it time for first shut-in?; is it time for second shut-in?; is it time for first flow or second flow?; is it time for reverse?"; referring also to FIG. 10, if the time T is (greater than or equal to time T1 or greater than or equal to time T3) and (less than time T2 or less than time T4), close the test valve (block b9) and return to the top of the block b3; if the time T is greater than or equal to time T4, open the reversing valve (block b10) and return to the top of block b3; if the time T is (greater than or equal to time To or greater than or equal to time T2) and (less than time T1 or less than time T3), open the test valve (block b11) and return to the top of block b3.

If automode 1 is not set, the ROM microcode asks "is automode 2 set?" (block b12). Automode 2 is a test whose sequence is automatically controlled based on a combination of time and measured bottom hole pressure. For example, if the measured bottom hole pressure falls on a certain curve (Horner straight line) or value, the processor 93a opens and/or closes the test valve and/or the reversing valve; otherwise, if the bottom hole pressure does not fall on such curve or value, the test valves and/or reversing valves are opened and/or closed in accordance with a predetermined elapsed time.

The following is a description of the automode 2 test.

The first question asked by the ROM microcode is: "what is the test type, impulse or conventional?" (block b13). An impulse test is a 1 flow test whereas a conventional test is a 2 flow test. If the test is the impulse type: open the test valve (block b14); ask "is the well killing itself?" (is the hydrostatic head pressure the=formation pressure?) (block b15); if yes, close the test valve (block b16), if no, ask "is the flow time exceeded (T is greater than or equal to T1)?" (block b17); if no, return to the top of block b3, if yes, close the test valve (block b16), then ask "is the Horner straight line reached?" (has the bottom hole pressure reached a predetermined criterion, the criterion in this case being the Horner straight line?) (block b18); if yes, open the reversing valve (block b19), if no, ask "is shut-in time exceeded (T greater than or equal to time T2)?" (block b20); if no, return to the top of the block b3, if yes, open the reversing valve (block b19) and return to the top of block b3, which asks "is override received?". If the test is the conventional type: open the test valve (block b21), and ask "is the well killing itself?" (block b22); if yes, close the test valve (block b23) and return to the top of block b3, if no, ask "is it time for shut-in (is T less than T1 or is T greater than or equal to T1)?" (block b24); if T is less than T1, it is not time for shut-in and return to the top of block b3; if T is greater than or equal to time T1, it is time for shut-in and close the test valve (block b25); ask "has the bottom hole pressure (BHP or Pbh) stabilized (i.e., is the current bottom hole pressure the previous bottom hole pressure)?" (bottom b26); if yes, open the test valve (block b27), if no, ask "is shut-in time exceeded (is T greater than or equal to T2)?" (block b28), if no, return to the top of block b3, if yes, open the test valve (block b27); the ROM microcode, as executed by the processor, asks "is the well killing itself?" (block b29), if yes, shut the test valve (block b30), if no, ask "is flow time exceeded (T greater than or equal to time T3?" (block b31); if no, return to top of block b3, if yes, shut the test valve (block b30); the ROM microcode (as interrogated by the processor portion) asks "is the Horner straight line reached?" (block b32), if yes, open the reversing valve (block b33) and return to the top of block b3, if no, ask "is shut-in time exceeded (is T greater than or equal to time T4)?" (block b34); if yes, open the reversing valve (block b33) and return to the top of block b3, if no, return to the top of block b3.

In the above functional and structural description of the ROM microcode, where the question is asked "is the Horner straight line reached" other criteria could be used, such as Log-Log straight line, or type curve matching. Where the question is asked "is the well killing itself", other criteria could be used or a feedback from a downhole flowmeter could be used to control the flowrate (e.g., constant Q) through a downhole variable choke. Blocks b10 and b33 are optional; reversing could be controlled only by override. In block b8, this is a preprogrammed test where T1, T2, T3, T4 are preset. In block b13, for the conventional test, the times T1–T4 maximums are preset; for the impulse test, the times T1, T2 maximums are preset.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. A well testing system adapted to be disposed in a borehole, comprising:

stimulus generating means for generating an initial kick-off stimulus;

a plurality of valves;

a plurality of control system means connected respectively to the plurality of valves for operating said valves; and control means interconnected between said plurality of control system means and said stimulus generating means for automatically controlling the operation of one or more of said plurality of control system means and thereby one or more of said plurality of valves in a predetermined manner in response to said initial kickoff stimulus.

2. The well testing system of claim 1, wherein said control means comprises a memory means for storing a set of instructions and a processor means connected to said memory means for executing said set of instructions in response to said initial kickoff stimulus and automatically controlling the operation of said one or more of said plurality of control system means during the execution of said instructions.

3. The well testing system of claim 2, wherein said set of instructions comprises a special instruction set, said plurality of valves include a first valve and a second valve, the processor means alternately opening and closing said first valve until a predetermined time is reached, said processor means opening said second valve after said predetermined time in response to execution of said special instruction set.

[4. A method of automatically controlling a plurality of valves disposed in a multi-valve well testing system when said system is disposed in a borehole, comprising:

generating an initial kickoff stimulus signal;

receiving said initial kickoff stimulus signal in a processor means disposed in said system;

executing in said processor means a set of instructions stored in a memory disposed in said system in response to said initial kickoff stimulus signal; and automatically controlling one or more of said plurality of valves during the execution of said set of instructions.]

[5. The method of claim 4, wherein the generating step comprises the step of:

sensing an annulus pressure around a tubing string and generating said initial kickoff stimulus signal when the sensed annulus pressure matches a predetermined criterion.]

[6. The method of claim 4, wherein the generating step comprises the step of:

sensing a bottom hole pressure inside a tubing string and generating said initial kickoff stimulus signal when the sensed bottom hole pressure matches a predetermined criterion.]

7. [The method of claim 4.] *A method of automatically controlling a plurality of valves disposed in a multi-valve well testing system when said system is disposed in a borehole, comprising:*

*generating an initial kickoff stimulus signal;*

*receiving said initial kickoff stimulus signal in a processor means disposed in said system;*

*executing in said processor means a set of instructions stored in a memory disposed in said system in response to said initial kickoff stimulus signal; and*

*automatically controlling one or more of said plurality of valves during the execution of said set of instructions,* wherein the generating step comprises the steps of:

sensing a set down weight of said multi-valve well testing system when said system is disposed in said borehole and generating said initial kickoff stimulus signal when the sensed set down weight matches a predetermined criterion.

8. The well testing system of claim 1 wherein said stimulus generating means comprises a pressure transducer.

9. The well testing system of claim 8, wherein the pressure transducer senses annulus pressure around tubing string in said borehole.

10. The well testing system of claim 8, wherein the pressure transducer senses bottom hole pressure inside a tubing string in said borehole.

11. The well testing system of claim 1, wherein said stimulus generating means comprises a strain gauge for sensing a set down weight of said well testing system when disposed in said borehole.

12. [The method of claim 4.] *A method of automatically controlling a plurality of valves disposed in a multi-valve well testing system when said system is disposed in a borehole, comprising:*

*generating an initial kickoff stimulus signal;*

*receiving said initial kickoff stimulus signal in a processor means disposed in said system;*

*executing in said processor means a set of instructions stored in a memory disposed in said system in response to said initial kickoff stimulus signal; and*

*automatically controlling one or more of said plurality of valves during the execution of said set of instructions,* wherein said plurality of valves includes a first valve and a second valve, and wherein the executing step comprises the steps of:

further executing a special instruction set, the further execution of the special instruction set including the steps of, opening and closing said first valve in an alternating manner until a predetermined time is reached, and opening said second valve after said predetermined time.

13. [The method of claim 4.] *A method of automatically controlling a plurality of valves disposed in a multi-valve well testing system when said system is disposed in a borehole, comprising:*

*generating an initial kickoff stimulus signal;*

*receiving said initial kickoff stimulus signal in a processor means disposed in said system;*

*executing in said processor means a set of instructions stored in a memory disposed in said system in response to said initial kickoff stimulus signal; and*

*automatically controlling one or more of said plurality of valves during the execution of said set of instructions,* wherein said plurality of valves includes a first valve and a second valve, and wherein the executing step comprises the steps of:

(a) opening said first valve;

(b) closing said first valve and determining if a measured bottom hole pressure matches a predetermined criterion;

(c) if said measured bottom hole pressure matches said predetermined criterion, opening one of said first valve and said second valve;

(d) if said measured bottom hole pressure does not match said predetermined criterion, determining if a predetermined time has elapsed;

(e) if said predetermined time has elapsed, opening one of said first valve and said second valve; and (f) if said predetermined time has not elapsed, returning to step (a).

*14. The well testing system of claim 1, wherein at least one of said plurality of control system means comprises a solenoid valve.*

*15. The well testing system of claim 2, wherein at least one of said plurality of control system means comprises a solenoid valve.*

*16. The well testing system of claim 3, wherein at least one of said plurality of control system means comprises a solenoid valve.*

*17. The well testing system of claim 8, wherein at least one of said plurality of control system means comprises a solenoid valve.*

*18. The well testing system of claim 9, wherein at least one of said plurality of control system means comprises a solenoid valve.*

*19. The well testing system of claim 10, wherein at least one of said plurality of control system means comprises a solenoid valve.*

*20. The well testing system of claim 11, wherein at least one of said plurality of control system means comprises a solenoid valve.*

*21. The well testing system of claim 1, wherein said stimulus generating means comprises: means for recognition of pulses of predetermined signature transmitted into said borehole.*

*22. The well testing system of claim 2, wherein said stimulus generating means comprises: means for recognition of pulses of predetermined signature transmitted into said borehole.*

*23. The well testing system of claim 3, wherein said stimulus generating means comprises: means for recognition of pulses of predetermined signature transmitted into said borehole.*

*24. The well testing system of claim 8, wherein said stimulus generating means comprises: means for recognition of pulses of predetermined signature transmitted into said borehole.*

*25. A method of automatically controlling a plurality of valves disposed in a multi-valve well testing system when said system is disposed in a borehole, comprising:*

*generating an initial kickoff stimulus signal;*

*receiving said initial kickoff stimulus signal in a processor means disposed in said system;*

*executing in said processor means a set of instructions stored in a memory disposed in said system in response to said initial kickoff stimulus signal; and*

*automatically controlling one or more of said plurality of valves during the execution of said set of instructions,*

*wherein automatic controlling step comprises the step of: operating a plurality of control system means connected respectively to said plurality of valves for operating said valves during the execution of said set of instructions.*

*26. The method of claim 25, wherein the generating step comprises the steps of: sensing an annulus pressure around a tubing string and generating said initial kickoff stimulus signal when the sensed annulus pressure matches a predetermined criterion.*

*27. The method of claim 25, wherein the generating step comprises the steps of: sensing an bottom hole pressure inside a tubing string and generating said initial kickoff stimulus signal when the sensed bottom hole pressure matches a predetermined criterion.*

*28. The method of claim 7, wherein automatic controlling step comprises the step of:*

*operating a plurality of control system means connected respectively to said plurality of valves for operating said valves during the execution of said set of instructions.*

*29. The method of claim 12, wherein automatic controlling step comprises the step of:*

*operating a plurality of control system means connected respectively to said plurality of valves for operating said valves during the execution of said set of instructions.*

*30. The method of claim 13, wherein automatic controlling step comprises the step of:*

*operating a plurality of control system means connected respectively to said plurality of valves for operating said valves during the execution of said set of instructions.*

*31. The method of claim 25, wherein the generating step comprises the steps of:*

*(a) recognizing pulses of predetermined signature transmitted into said borehole, wherein each of the pulses of predetermined signature comprises a predetermined magnitude and a predetermined duration, and wherein the predetermined magnitude and the predetermined duration define the predetermined signature; and*

*(b) producing said initial kickoff stimulus signal for control of one of said plurality of valves based on said pulses of predetermined signature.*

*32. The method of claim 29, wherein the generating step comprises the steps of:*

*(a) recognizing pulses of predetermined signature transmitted into said borehole, wherein each of the pulses of predetermined signature comprises a predetermined magnitude and a predetermined duration, and wherein the predetermined magnitude and the predetermined duration define the predetermined signature; and*

*(b) producing said initial kickoff stimulus signal for control of one of said plurality of valves based on said pulses of predetermined signature.*

*33. The well testing system of claim 9, wherein said stimulus generating means comprises: means for recognition of pulses of predetermined signature transmitted into said borehole.*

*34. The method of claim 26, wherein the generating step comprises the steps of:*

*(a) recognizing pulses of predetermined signature transmitted into said borehole, wherein each of the pulses of predetermined signature comprises a predetermined magnitude and a predetermined duration, and wherein the predetermined magnitude and the predetermined duration define the predetermined signature; and*

*(b) producing said initial kickoff stimulus signal for control of one of said plurality of valves based on said pulses of predetermined signature.*

*35. The well testing system of claim 1, wherein said stimulus generating means comprises: means for recognition of pulses of predetermined signature transmitted into said borehole, wherein said pulses are propagated in a borehole fluid.*

*36. The well testing system of claim 2, wherein said stimulus generating means comprises: means for recognition of pulses of predetermined signature transmitted into said borehole, wherein said pulses are propagated in a borehole fluid.*

*37. The well testing system of claim 3, wherein said stimulus generating means comprises: means for recognition of pulses of predetermined signature transmitted into said borehole, wherein said pulses are propagated in a borehole fluid.*

*38. The well testing system of claim 8, wherein said stimulus generating means comprises: means for recognition of pulses of predetermined signature transmitted into said borehole, wherein said pulses are propagated in a borehole fluid.*

*39. The well testing system of claim 9, wherein said stimulus generating means comprises: means for recognition of pulses of predetermined signature transmitted into said borehole, wherein said pulses are propagated in a borehole fluid.*

*40. A method of automatically controlling a plurality of valves disposed in a multi-valve well testing system when said system is disposed in a borehole, comprising:*

*generating an initial kickoff stimulus signal;*

*receiving said initial kickoff stimulus signal in a processor means disposed in said system;*

*executing in said processor means a set of instructions stored in a memory disposed in said system in response to said initial kickoff stimulus signal; and*

*automatically controlling one or more of said plurality of valves during the execution of said set of instructions,*

*wherein the generating step comprises the steps of:*

*(a) recognizing pulses of predetermined signature transmitted into said borehole via a borehole fluid, wherein each of the pulses of predetermined signature comprises a predetermined magnitude and a predetermined duration, and wherein the predetermined magnitude and the predetermined duration define the predetermined signature; and*

*(b) producing said initial kickoff stimulus signal for control of one of said plurality of valves based on said pulses of predetermined signature when the pulses of predetermined signature are detected.*

*41. The method of claim 40, wherein the recognizing pulses of predetermined signature step comprises detecting the pulses of predetermined signature in an annulus pressure around a tubing string.*

*42. The method of claim 40, wherein the recognizing pulses of predetermined signature step comprises detecting the pulses of predetermined signature in a bottom hole pressure inside a tubing string.*

*43. The method of claim 40, wherein the pulses of predetermined signature comprise two or more pulses in a series to form a command signal.*

*44. The method of claim 41, wherein the pulses of predetermined signature comprise two or more pulses in a series to form a command signal.*

*45. The method of claim 42, wherein the pulses of predetermined signature comprise two or more pulses in a series to form a command signal.*

* * * * *